(12) United States Patent
Inoue et al.

(10) Patent No.: US 11,437,842 B2
(45) Date of Patent: Sep. 6, 2022

(54) POWER SUPPLY CONTROL DEVICE, SWITCHING POWER SUPPLY, AND ELECTRONIC APPARATUS

(71) Applicant: SEIKO EPSON CORPORATION, Tokyo (JP)

(72) Inventors: Katsumi Inoue, Matsumoto (JP); Kanji Aoki, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 355 days.

(21) Appl. No.: 16/824,813

(22) Filed: Mar. 20, 2020

(65) Prior Publication Data

US 2020/0303941 A1 Sep. 24, 2020

(30) Foreign Application Priority Data

Mar. 22, 2019 (JP) .............................. JP2019-054159
Aug. 29, 2019 (JP) .............................. JP2019-156438

(51) Int. Cl.
*H02M 3/335* (2006.01)
*H02J 7/06* (2006.01)
*H02M 7/219* (2006.01)
*H02M 3/137* (2006.01)
*H02M 1/00* (2006.01)

(52) U.S. Cl.
CPC .............. *H02J 7/06* (2013.01); *H02M 1/0006* (2021.05); *H02M 3/137* (2013.01); *H02M 3/33523* (2013.01); *H02M 7/219* (2013.01)

(58) Field of Classification Search
CPC .. H02M 1/0006; H02M 1/0025; H02M 3/335; H02M 3/33523; H02M 3/33553
See application file for complete search history.

(56) References Cited

U.S. PATENT DOCUMENTS

| 2012/0113685 | A1* | 5/2012 | Inukai | H02M 1/36 363/21.01 |
| 2014/0104894 | A1* | 4/2014 | Yamane | H02M 3/33515 363/21.13 |
| 2014/0177286 | A1 | 6/2014 | Sonobe | |
| 2016/0344288 | A1* | 11/2016 | Tadamasa | H02M 1/36 |
| 2018/0026523 | A1* | 1/2018 | Nate | H05B 45/10 318/504 |
| 2020/0304031 | A1* | 9/2020 | Inoue | H02M 1/0006 |

FOREIGN PATENT DOCUMENTS

| JP | 2003-189596 A | 7/2003 |
| JP | 2011-244602 A | 12/2011 |
| JP | 2014-124038 A | 7/2014 |
| WO | 2011/122314 A1 | 10/2011 |

* cited by examiner

*Primary Examiner* — Gary L Laxton
(74) *Attorney, Agent, or Firm* — Rankin, Hill & Clark LLP

(57) ABSTRACT

A power supply control device includes a charge circuit, a detection circuit, and a charge control circuit. The charge circuit charges a capacitor coupled to a power supply voltage node based on a full-wave rectified voltage. The charge control circuit enables a charge mode of the charge circuit when the detection circuit detects that a power supply voltage is less than a first threshold voltage. The charge control circuit disables the charge mode when the detection circuit detects that the power supply voltage reached a second threshold voltage. The charge control circuit sets a charge capacity of the charge circuit in a second charge mode period according to a length of a first charge mode period.

13 Claims, 22 Drawing Sheets

FIG. 6
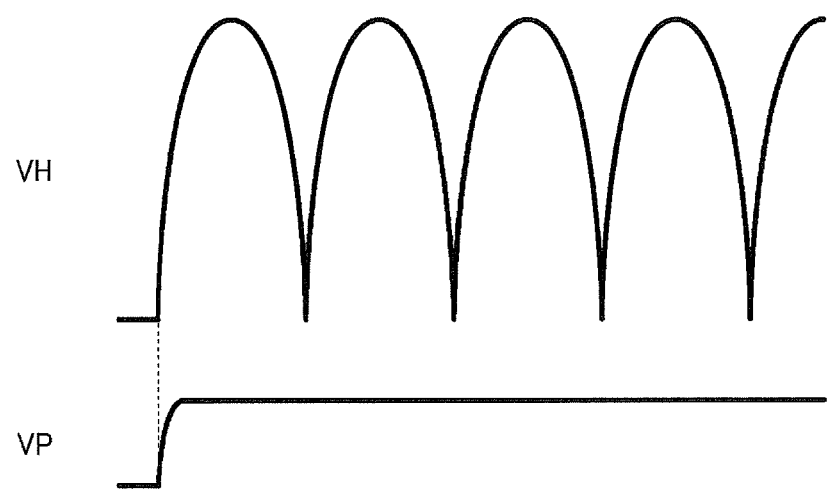
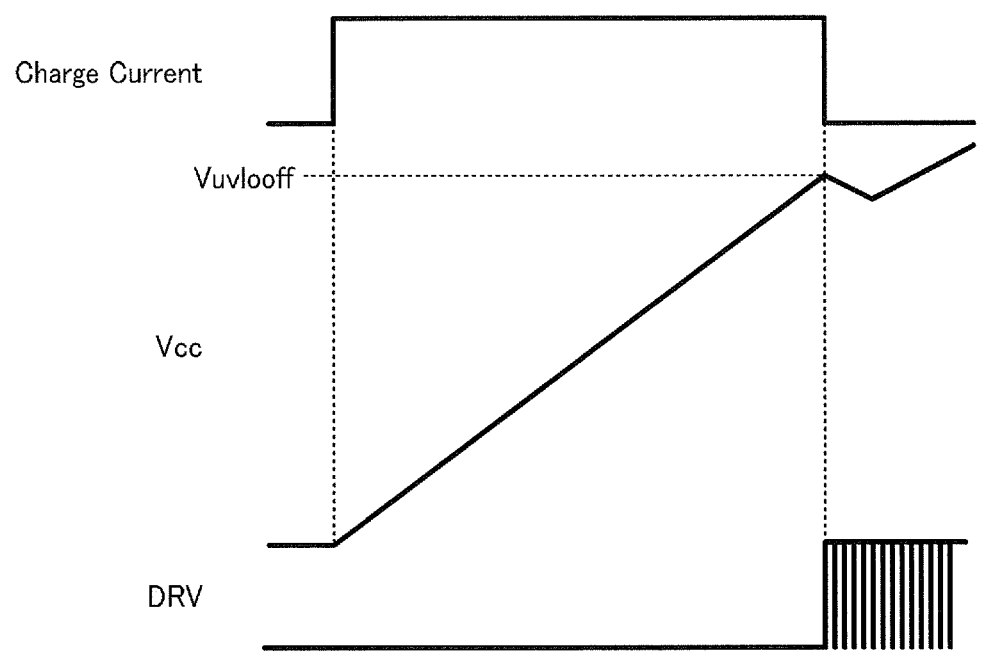

 US 11,437,842 B2

POWER SUPPLY CONTROL DEVICE, SWITCHING POWER SUPPLY, AND ELECTRONIC APPARATUS

The present application is based on, and claims priority from JP Application Serial Number 2019-054159, filed Mar. 22, 2019 and JP Application Serial Number 2019-156438, filed Aug. 29, 2019, the disclosures of which are hereby incorporated by reference herein in their entirety.

BACKGROUND

1. Technical Field

The present disclosure relates to a power supply control device, a switching power supply, an electronic apparatus, and a like.

2. Related Art

In the related art, a switching power supply that generates an output voltage by supplying a DC voltage obtained by rectifying an AC voltage from an AC power supply to a primary winding of a transformer by turning it on/off using a switching element and rectifying and smoothing a voltage induced in a secondary winding of the transformer is known. Here, the on/off of the switching element is generally controlled by a power supply control device integrated in a semiconductor.

As a power supply of such a power supply control device, a voltage induced in the auxiliary winding of the transformer by turning on/off the switching element is used. Specifically, a voltage obtained by rectifying the voltage induced in the auxiliary winding and charged into the capacitor is used as the power supply of the power supply control device. For example, when the power supply switch of an electronic apparatus to which an output voltage is supplied is turned off, the power supply control device lowers the output voltage in order to reduce the power consumption. Then, the voltage induced in the auxiliary winding of the transformer also decreases, so that the power supply control device consumes electric power and the charge voltage of the capacitor becomes insufficient.

JP-A-2011-244602 discloses a technology that charges a capacitor with a full-wave rectified voltage of the AC voltage from the AC power supply by turning on a start-up circuit provided in the power supply control device when the charge voltage of the capacitor is insufficient. In the technology, when the start-up circuit is turned on with the full-wave rectified voltage being high, the loss increases. Therefore, the start-up circuit is turned on when the voltage of the node to which the full-wave rectified voltage is input is less than the threshold value.

In the power supply control device that turns on the start-up circuit when the voltage of the node to which the full-wave rectified voltage is input is less than the threshold value, if the threshold value is too low, the ability to charge the capacitor is insufficient, and if the threshold value is too high, power loss in the charge path in the power supply control device increases. An appropriate threshold value for achieving both of these changes depending on the amplitude or frequency of the AC voltage, but JP-A-2011-244602 does not disclose a method for setting an appropriate threshold value.

SUMMARY

An aspect of the present disclosure relates to a power supply control device including a charge circuit that charges a capacitor coupled to a power supply voltage node based on a full-wave rectified voltage input to a first node, a detection circuit that detects whether or not a power supply voltage which is a voltage of the power supply voltage node is lower than a first threshold voltage and whether or not the power supply voltage reached a second threshold voltage higher than the first threshold voltage, and a charge control circuit that performs charge control with respect to the charge circuit based on a detection result from the detection circuit, in which the charge control circuit enables a charge mode of the charge circuit when the detection circuit detects that the power supply voltage is lower than the first threshold voltage, and disables the charge mode when the detection circuit detects that the power supply voltage reached the second threshold voltage, and the charge control circuit sets charge capacity of the charge circuit in a second charge mode period in which the charge mode is subsequently enabled according to a length of a first charge mode period in which the charge mode is enabled.

BRIEF DESCRIPTION OF THE DRAWINGS

FIG. 6 is a waveform diagram for explaining the operation at the time of starting the power supply control device.

DESCRIPTION OF EXEMPLARY EMBODIMENTS

Hereinafter, preferred embodiments of the present disclosure will be described in detail. In addition, the present embodiments described below do not unduly limit the contents described in the appended claims, and not all the configurations described in the present embodiments are indispensable constituent elements.

1. Switching Power Supply

Figure 1:
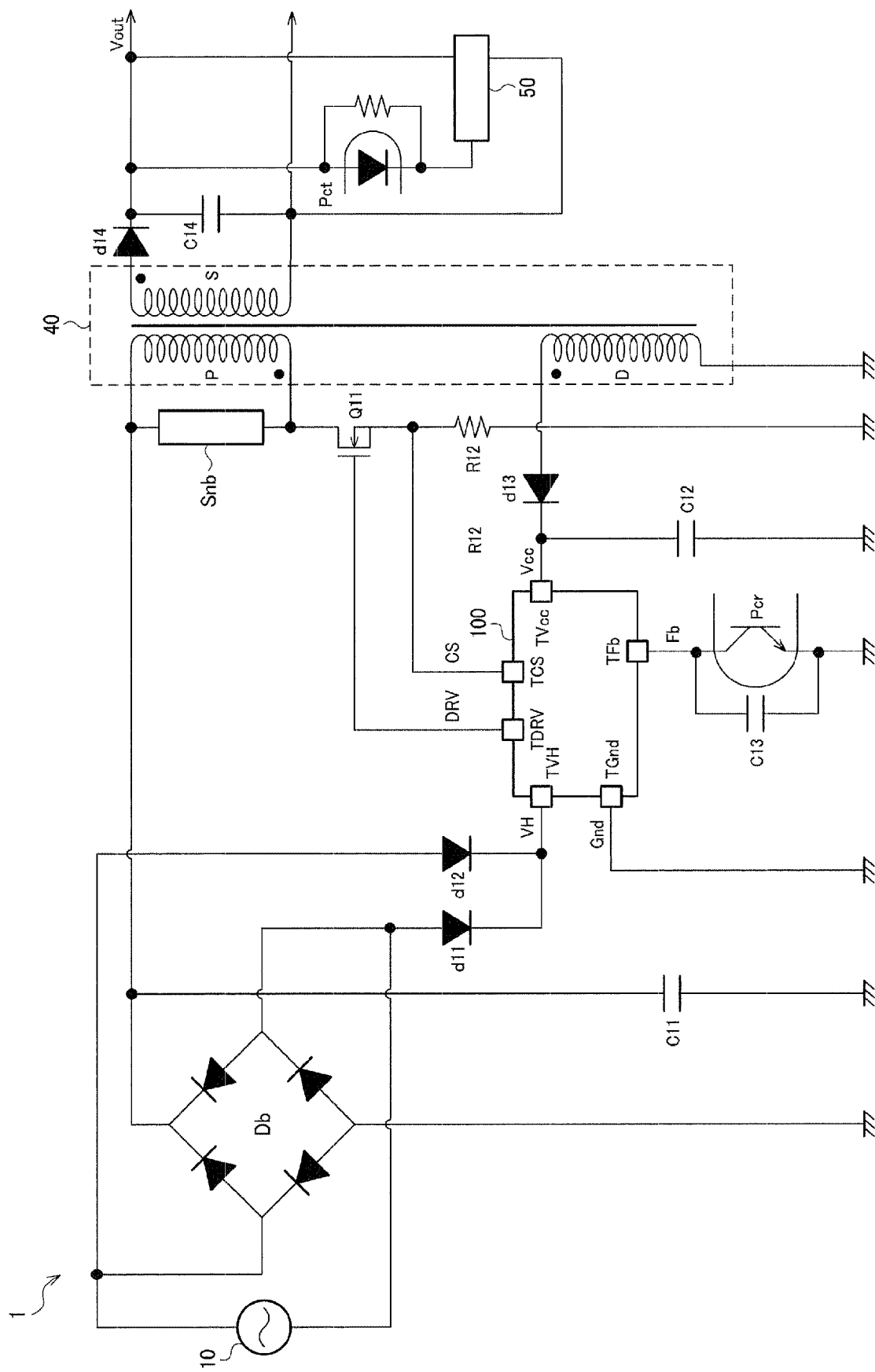
FIG. 1 is a configuration example of a switching power supply.

FIG. 1 is a configuration example showing a switching power supply 1 including a power supply control device 100. The switching power supply 1 includes an AC power supply 10, a transformer 40, an error amplifier 50, a power supply control device 100, a diode bridge Db, a transistor Q11, capacitors C11, C12, C13, and C14, diodes d11, d12, d13, and d14, and a resistor.

The switching power supply 1 is a so-called flyback ACDC converter. Specifically, the switching power supply 1 stores energy by causing a current to flow through a primary winding P of the transformer 40 when the transistor Q11 is turned on. The switching power supply 1 outputs the energy stored in the primary winding P from a secondary winding S of the transformer 40 via the diode d14 by turning off the transistor Q11. The switching power supply 1 generates a DC voltage Vout by smoothing the voltage output from the diode d14 by the capacitor C14.

The diode bridge Db is an example of a first rectifier circuit. The AC voltage from the AC power supply 10 is the AC input voltage of the switching power supply 1. The diode bridge Db rectifies the AC voltage from the AC power supply 10. The positive terminal of the diode bridge Db is coupled to one end of the primary winding P in the transformer 40 and one end of a capacitor C11, and the negative terminal of the diode bridge Db and the other end of the capacitor C11 are grounded to a node Gnd. The node Gnd is a ground node to which a ground voltage is input, and is coupled to a ground terminal TGnd of the power supply control device 100.

The transformer 40 has a secondary winding S and an auxiliary winding D in addition to the primary winding P. The other end of the primary winding P is coupled to the drain node of the transistor Q11. The transistor Q11 is an example of a switching element. The transistor Q11 is an N-channel MOSFET, for example, and has a source node coupled to one end of a resistor R12. The other end of the resistor R12 is grounded to a node Gnd. For this reason, the primary winding P and the transistor Q11 are provided in series between the positive terminal and the negative terminal in the diode bridge Db.

A snubber circuit Snb is provided between one end and the other end of the primary winding P in the transformer 40. When the transistor Q11 is turned on/off, a transient voltage is generated in the primary winding P. The snubber circuit Snb absorbs the transient voltage.

One end of the secondary winding S is coupled to the anode of the diode d14. The capacitor C14 is coupled between the cathode of the diode d14 and the other end of the secondary winding S. The voltage smoothed by the capacitor C14 is output as Vout. The diode d14 and the capacitor C14 function as an example of a first output circuit that rectifies and smooths the voltage induced in the secondary winding S. Vout is a DC output voltage of the switching power supply 1.

Alight emitting diode Pct and a phototransistor Pcr constitute a photocoupler. The anode of the light emitting diode Pct is coupled to the cathode of the diode d14, and the cathode of the light emitting diode Pct is coupled to the error amplifier 50. The error amplifier 50 causes a current corresponding to the deviation between the voltage Vout and the error amplifier reference voltage to flow through the light emitting diode Pct.

One end of the auxiliary winding D in the transformer 40 is coupled to the anode of the diode d13, and the cathode of the diode d13 is coupled to a power supply terminal TVcc of the power supply control device 100 and one end of the capacitor C12. The voltage of the power supply terminal TVcc is set to a power supply voltage Vcc. The other end of the auxiliary winding D and the other end of the capacitor C12 are grounded to a node Gnd.

The voltage induced in the auxiliary winding D of the transformer 40 is rectified by the diode d13, smoothed by the capacitor C12 and charged therein, and supplied to the power supply terminal TVcc as the power supply voltage Vcc of the power supply control device 100. For this reason, the diode d13 and the capacitor C12 function as an example of a second output circuit that rectifies and smooths the voltage induced in the auxiliary winding D.

The emitter of the phototransistor Pcr is grounded to the node Gnd, and the collector is coupled to a terminal TFb in the power supply control device 100. The capacitor C13 is coupled in parallel with the phototransistor Pcr. The phototransistor Pcr applies a collector current corresponding to the amount of light received from the light emitting diode Pct. That is, as the voltage Vout is higher, the light emission amount of the light emitting diode Pct increases, and thus the collector current of the phototransistor Pcr increases.

The power supply control device 100 is integrated in, for example, a semiconductor, and the terminal TFb is pulled up by a resistor from its internal power supply voltage. A voltage Fb of the terminal TFb is generated as the collector current of the phototransistor Pcr flows through the terminal TFb. The voltage Fb changes according to the collector current of the phototransistor Pcr. That is, the voltage Fb is a voltage according to the deviation of the voltage Vout. As will be described later, the power supply control device 100 detects the voltage Fb and controls on/off of the transistor Q11 in such a direction that the deviation indicated by the voltage Fb becomes zero. Specifically, a voltage CS at one end of the resistor R12 is input to a terminal TCS of the power supply control device 100. The power supply control device 100 generates a drive signal DRV by performing PWM control such that the deviation of the voltage Vout becomes zero based on the voltage Fb and the voltage CS and supplies the drive signal DRV to the gate node of the transistor Q11.

In FIG. 1, the transistor Q11 is separate from the power supply control device 100, but may be integrated in the power supply control device 100.

The diodes d11 and d12 perform full-wave rectification of the AC voltage from the AC power supply 10. The full-wave rectified voltage VH is input to a terminal TVH of the power supply control device 100. The diodes d11 and d12 are an example of a second rectifier circuit.

When the AC power supply 10 is just coupled or immediately after the power is turned on, a sufficient voltage is not charged in the capacitor C12. If for some reason the transistor Q11 does not turn on/off, no voltage is induced in the auxiliary winding D, so the voltage charged in the capacitor C12 decreases and the charge voltage becomes insufficient. In preparation for such a case, the power supply control device 100 performs control for charging the capacitor C12 using the full-wave rectified voltage VH applied to the terminal TVH.

2. Basic Configuration Example and First Embodiment

Figure 2:
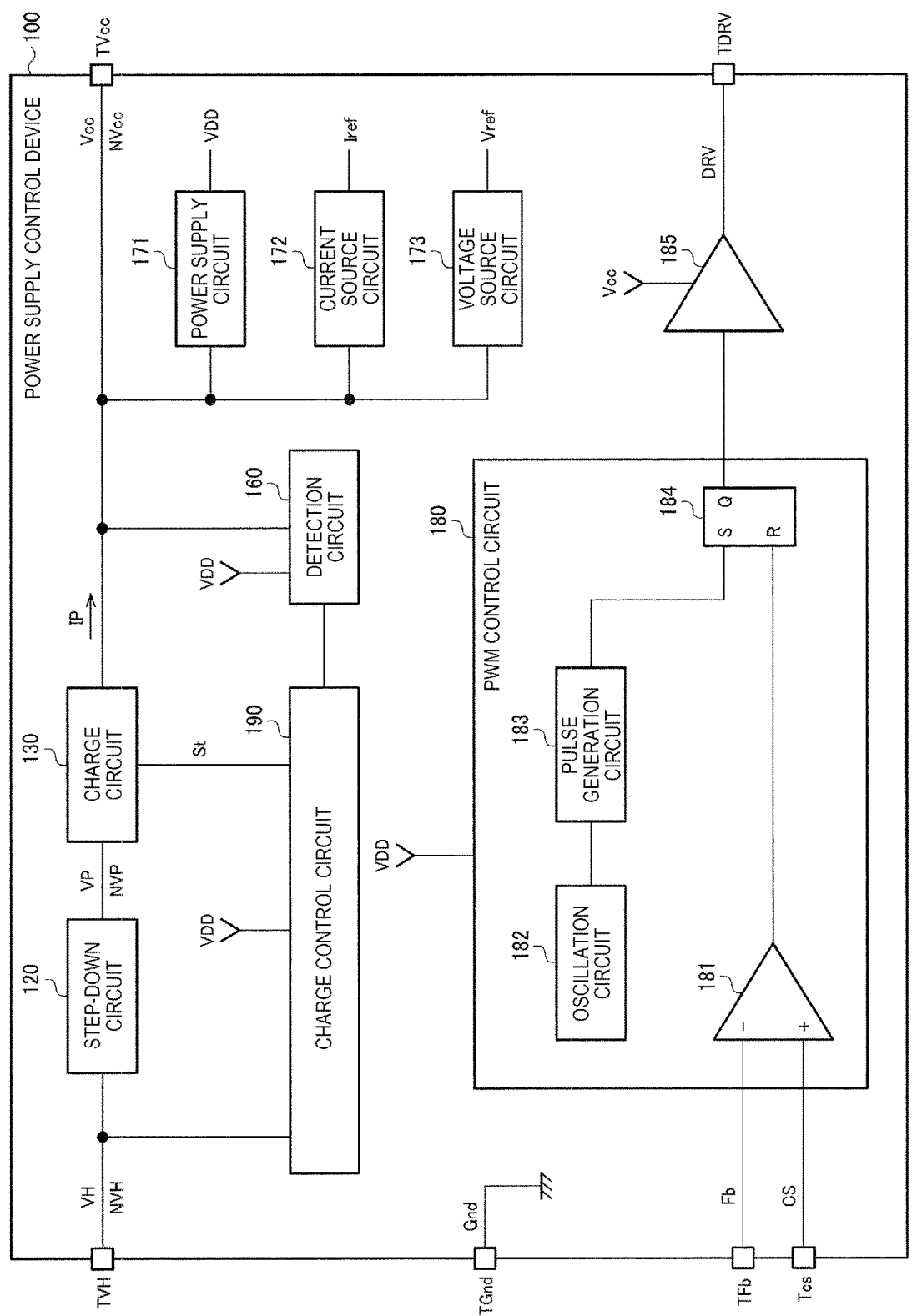
FIG. 2 is a basic configuration example of a power supply control device.

FIG. 2 is a basic configuration example of the power supply control device 100. The power supply control device 100 includes a step-down circuit 120, a charge circuit 130, a charge control circuit 190, a detection circuit 160, a power supply circuit 171, a current source circuit 172, a voltage source circuit 173, a PWM control circuit 180, a driver circuit 185, the power supply terminal TVcc, and terminals TVH, TGnd, TFb, TCS, and TDRV. The power supply control device 100 is an integrated circuit device called integrated circuit (IC). For example, the power supply control device 100 is an IC manufactured by a semiconductor process, and is a semiconductor chip in which circuit elements are formed on a semiconductor substrate.

As described in FIG. 1, the full-wave rectified voltage VH is input to the terminal TVH. As a result, the full-wave rectified voltage VH is input to a node NVH coupled to the terminal TVH. The node NVH is the first node. The step-down circuit 120 steps down the full-wave rectified voltage VH and outputs the stepped-down voltage VP to a node NVP. As will be described later, the step-down circuit 120 steps down the full-wave rectified voltage VH using the pinch-off of the field effect transistor.

The charge circuit 130 charges the capacitor C12 coupled to the power supply terminal TVcc based on the voltage VP. The charge circuit 130 includes a transistor provided between the node NVP and a node NVcc. The node NVcc is a power supply voltage node and is a node coupled to the power supply terminal TVcc. The node NVcc is also called a second node. When the transistor is on, a charge current IP is output to the node NVcc via the transistor. The charge circuit 130 charges the capacitor C12 when the switching power supply 1 is started up and when the power supply voltage Vcc is decreased after the startup. Since it is also used at the time of startup, the charge circuit 130 is also called a start-up circuit.

Figure 25:
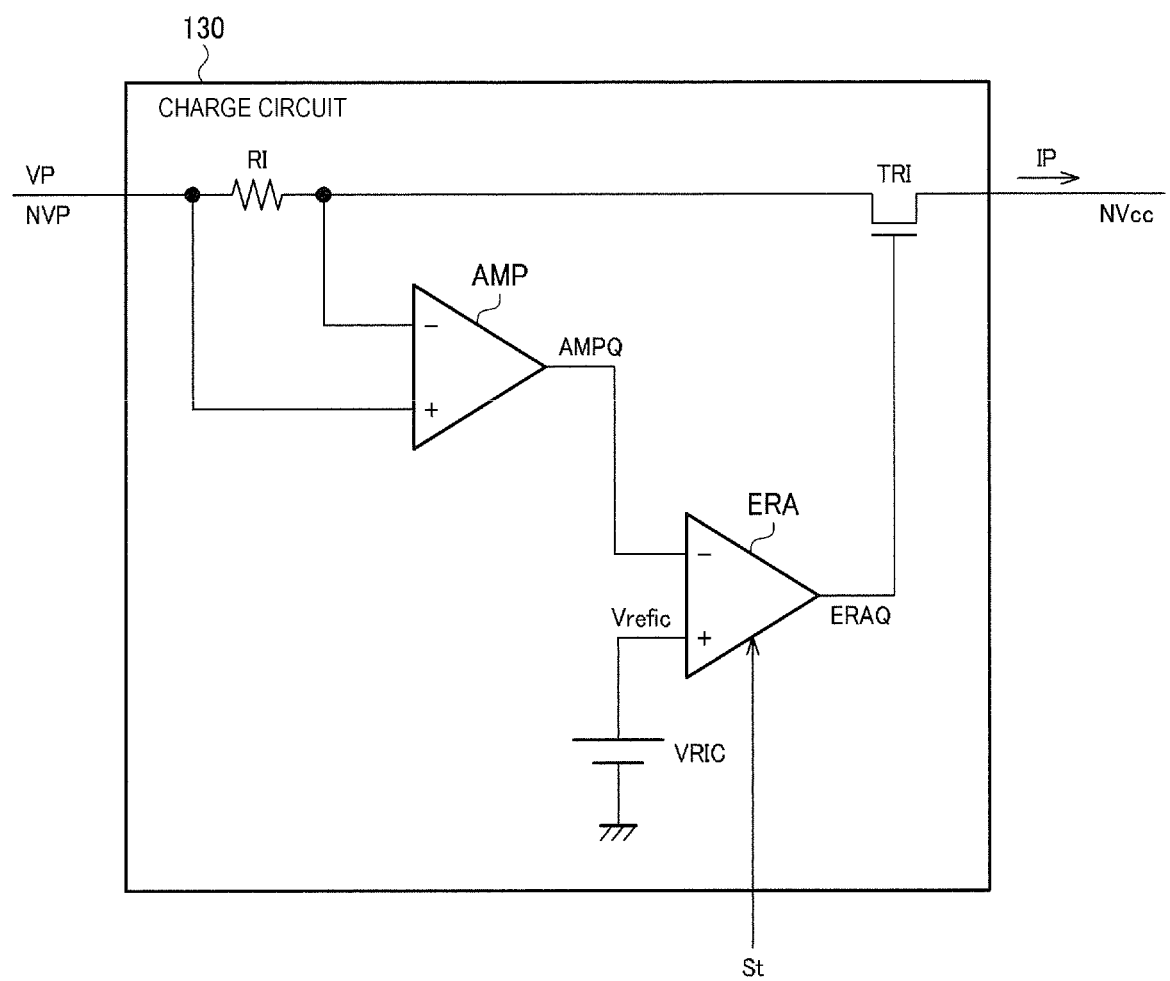
FIG. 25 is a detailed configuration example of the charge circuit according to the first embodiment.

FIG. 25 shows a detailed configuration example of the charge circuit 130. The charge circuit 130 includes a resistor RI, a transistor TRI, an amplifier circuit AMP, an error amplifier circuit ERA, and a reference voltage generation circuit VRIC.

One end of the resistor RI is coupled to the node NVP, and the other end of the resistor RI is coupled to one of the source and the drain of the transistor TRI. The other of the source and the drain of the transistor TRI is coupled to the node NVcc.

The amplifier circuit AMP amplifies the potential difference between both ends of the resistor RI and outputs the result as a voltage AMPQ. The reference voltage generation circuit VRIC generates a low voltage reference voltage Vrefic. The error amplifier circuit ERA amplifies the difference between the voltage AMPQ and the reference voltage Vrefic, and outputs the result as a voltage ERAQ to the gate of the transistor TRI. The transistor TRI outputs a charge current IP corresponding to the voltage ERAQ to the node NVcc.

Since the same current as the charge current IP flows through the resistor RI, the voltage AMPQ is a voltage corresponding to the charge current IP. When the voltage AMPQ is lower than the reference voltage Vrefic, the voltage ERAQ increases, so the charge current IP increases and the voltage AMPQ increases. When the voltage AMPQ is higher than the reference voltage Vrefic, the voltage ERAQ decreases, so the charge current IP decreases and the voltage AMPQ decreases. By such feedback, the charge current IP is set such that the voltage AMPQ and the reference voltage Vrefic become the same.

A signal St is input from the charge control circuit 190 to the error amplifier circuit ERA. When the signal St is inactive, the error amplifier circuit ERA is disabled and outputs a voltage for turning off the transistor TRI to the gate of the transistor TRI. At this time, since the transistor TRI is turned off, the charge current IP becomes zero. When the signal St is active, the error amplifier circuit ERA is enabled and outputs a voltage ERAQ obtained by amplifying the difference between the voltage AMPQ and the reference voltage Vrefic to the gate of the transistor TRI. At this time, the transistor TRI outputs a charge current IP corresponding to the voltage ERAQ.

The method in which the charge circuit 130 turns on/off the charge current IP based on the signal St is not limited to the above. For example, an on/off transistor may be provided in series with the transistor TRI, and the signal St may be input to the gate of the on/off transistor. The error amplifier circuit ERA outputs the voltage ERAQ obtained by amplifying the difference between the voltage AMPQ and the reference voltage Vrefic to the gate of the transistor TRI regardless of the logic level of the signal St. When the signal St is inactive, the on/off transistor is turned off and the charge current IP becomes zero. When the signal St is active, the on/off transistor is turned on, and the charge current IP corresponding to the voltage ERAQ is output to the node NVcc.

As shown in FIG. 2, the detection circuit 160 detects the power supply voltage Vcc, which is the voltage of the node NVcc, and outputs the detection result as a charge mode setting signal Vdetvcc. The charge control circuit 190 performs charge control for the charge circuit 130 based on the charge mode setting signal Vdetvcc. The charge control circuit 190 outputs the signal St to the charge circuit 130, thereby controlling on/off of the transistor. Details of the detection circuit 160 and the charge control circuit 190 will be described later.

The PWM control circuit 180 generates a PWM signal based on the voltage Fb input to the terminal TFb and the voltage CS input to the terminal TCS. The driver circuit 185 outputs the drive signal DRV by buffering the PWM signal. The drive signal DRV is input from the terminal TDRV to the gate of the transistor Q11 in FIG. 1.

Specifically, the PWM control circuit 180 includes a comparator 181, an oscillation circuit 182, a pulse generation circuit 183, and an RS latch circuit 184. The oscillation circuit 182 generates a clock signal for PWM control. The pulse generation circuit 183 generates a pulse signal at the edge of the clock signal, and inputs the pulse signal to the set terminal of the RS latch circuit 184. The RS latch circuit 184 changes the PWM signal from the low level to the high level at the edge of the pulse signal. This turns on the transistor Q11.

In the switching power supply 1 of FIG. 1, when the transistor Q11 is turned on, a current flows to the resistor R12 via the primary winding P of the transformer 40 and the transistor Q11. The current increases with time. The output signal of the comparator 181 is input to the reset terminal of the RS latch circuit 184. When the voltage CS exceeds the voltage Fb, the output signal of the comparator 181 changes from the low level to the high level, and the RS latch circuit 184 changes the PWM signal from the high level to the low level at that edge. This turns off the transistor Q11.

Since the higher the voltage Vout, the lower the voltage Fb, so that the timing at which the PWM signal goes low becomes earlier, and the duty of the PWM signal decreases. Conversely, the lower the voltage Vout, the higher the voltage Fb, so that the timing at which the PWM signal goes low is delayed, and the duty of the PWM signal increases. Thereby, feedback is performed so that the voltage Vout becomes constant.

The power supply circuit 171 generates the internal power supply voltage VDD by stepping down the power supply voltage Vcc. The internal power supply voltage VDD is supplied to the charge control circuit 190, the detection circuit 160, and the PWM control circuit 180, and these circuits operate using the internal power supply voltage VDD as a power supply. The current source circuit 172 generates a reference current Iref based on the power supply voltage Vcc. The reference current Iref is used as a reference current in each circuit in the power supply control device 100. The voltage source circuit 173 generates the reference voltage Vref based on the power supply voltage Vcc. The reference voltage Vref is used as a reference voltage in each circuit in the power supply control device 100. The reference voltage Vref is, for example, reference voltages Vrefa and Vrefb described later. The power supply voltage Vcc is supplied to the driver circuit 185, and the driver circuit 185 operates using the power supply voltage Vcc as a power supply.

As described in FIG. 1, the voltage induced in the auxiliary winding D of the transformer 40 is rectified, the capacitor C12 is charged with the rectified voltage, and the voltage charged in the capacitor C12 is input to the power supply terminal TVcc as the power supply voltage Vcc. The voltage induced in the auxiliary winding D is determined by the winding ratio of the transformer 40. For this reason, when the voltage Vout generated based on the voltage induced in the secondary winding S decreases, the power supply voltage Vcc decreases similarly. For example, when a power switch of an electronic apparatus that uses the voltage Vout is turned off, the switching power supply 1 lowers the voltage Vout to reduce power consumption. Then, since the voltage induced in the auxiliary winding D of the transformer 40 also decreases, the voltage charged in the capacitor C12 also decreases. As described above, the power supply voltage Vcc is used in the power supply control device 100 via the power supply circuit 171 or the like. However, when the voltage charged in the capacitor C12 decreases, the power supply voltage Vcc decreases, and the power supply control device 100 becomes inoperable. Therefore, the charge circuit 130 charges the capacitor C12 using the voltage VP obtained by stepping down the full-wave rectified voltage VH. Thereby, power supply voltage Vcc is maintained at a voltage at which power supply control device 100 can operate.

Hereinafter, control for charging the capacitor C12 based on the full-wave rectified voltage VH will be described. Only the circuits related to the control will be illustrated below. That is, illustration of the PWM control circuit 180, the driver circuit 185, the power supply circuit 171, the current source circuit 172, and the voltage source circuit 173 is omitted.

Figure 3:
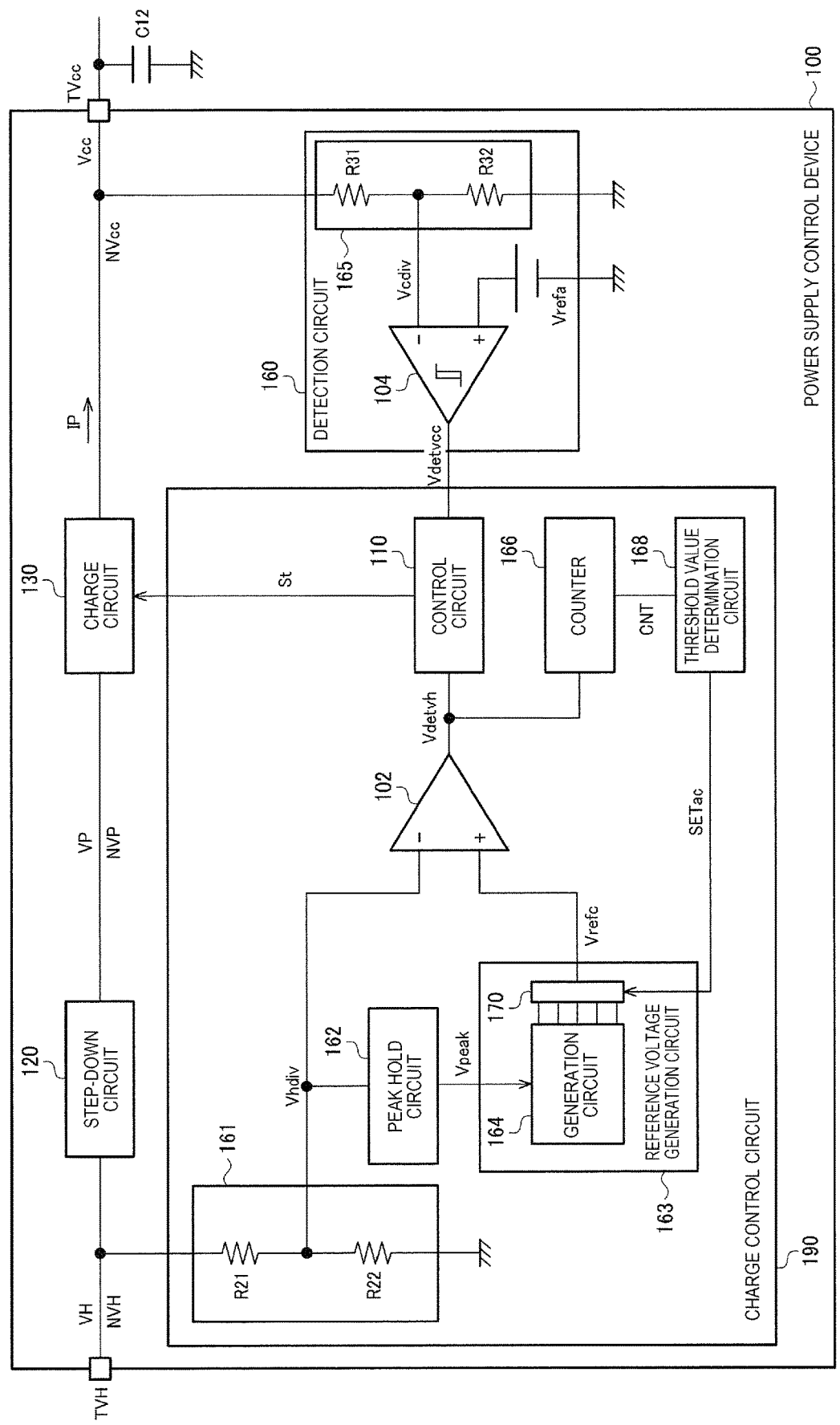
FIG. 3 is a configuration example of the power supply control device in a first embodiment.

FIG. 3 is a configuration example of the power supply control device 100 in the first embodiment. The power supply control device 100 includes a step-down circuit 120, a charge circuit 130, a charge control circuit 190, a detection circuit 160, a terminal TVH, and a power supply terminal TVcc.

The detection circuit 160 detects whether or not the power supply voltage Vcc is lower than the first threshold voltage and whether or not the power supply voltage Vcc reached the second threshold voltage. The second threshold voltage is higher than the first threshold voltage. Hereinafter, the first threshold voltage is referred to as Vdet_L and is simply called threshold voltage Vdet_L. Also, the second threshold voltage is referred to as Vdet_U and is simply called threshold voltage Vdet_U. Vdet_L is also called a second voltage, and Vdet_U is also called a third voltage. The detection circuit 160 includes a power supply voltage divider circuit 165 and a Schmitt trigger circuit 104.

The power supply voltage divider circuit 165 outputs a divided power supply voltage Vccdiv obtained by dividing the power supply voltage Vcc. Specifically, the power supply voltage divider circuit 165 includes a resistor R31 and a resistor R32 coupled in series between the node NVcc and the node Gnd. The divided power supply voltage Vccdiv is output from a node between the resistors R31 and R32.

The Schmitt trigger circuit 104 compares the reference voltage Vrefa and the divided power supply voltage Vccdiv, and outputs the comparison result as a charge mode setting signal Vdetvcc. The reference voltage Vrefa is also called a detection reference voltage. The Schmitt trigger circuit 104 has hysteresis. For this reason, the detection threshold value differs between when the divided power supply voltage Vccdiv decreases and when the divided power supply voltage Vccdiv increases. Considering this as the power supply voltage Vcc before voltage division, when the power supply voltage Vcc decreases, it is detected whether or not the power supply voltage Vcc is lower than the threshold voltage Vdet_L, and when the power supply voltage Vcc increases, it is detected whether or not the power supply voltage Vcc reached the threshold voltage Vdet_U.

The charge control circuit 190 detects whether or not the full-wave rectified voltage VH is lower than the threshold voltage for rectified voltage during the charge mode period. The charge mode period is a period in which the charge mode is enabled, that is, a period in which the charge mode setting signal Vdetvcc is active. Hereinafter, the threshold voltage for rectified voltage is referred to as Vth_ac, and is simply called threshold voltage Vth_ac below. The threshold voltage Vth_ac is also called a first voltage. The charge control circuit 190 causes the charge circuit 130 to perform a charging operation for charging the capacitor C12 during a period in which it is detected that the full-wave rectified voltage VH is lower than the threshold voltage Vth_ac in the charge mode period. The charge control circuit 190 includes a rectified voltage divider circuit 161, a peak hold circuit 162, a reference voltage generation circuit 163, a comparator 102, a control circuit 110, a counter 166, and a threshold value determination circuit 168.

The rectified voltage divider circuit 161 outputs a divided rectified voltage VHdiv obtained by dividing the full-wave rectified voltage VH. Specifically, the rectified voltage divider circuit 161 includes a resistor R21 and a resistor R22 coupled in series between the node NVH to which the full-wave rectified voltage VH is input and a node Gnd. The divided rectified voltage VHdiv is output from a node between the resistors R21 and R22.

The peak hold circuit 162 holds the peak voltage of the divided rectified voltage VHdiv and outputs the held voltage as the hold voltage Vpeak. The hold voltage Vpeak is a voltage corresponding to the AC voltage output from the AC power supply 10. That is, a voltage obtained by dividing half of the amplitude of the AC voltage by the voltage dividing ratio of the rectified voltage divider circuit 161 corresponds to the hold voltage Vpeak.

The reference voltage generation circuit 163 generates a reference voltage Vrefc from the hold voltage Vpeak. The reference voltage Vrefc is also called a reference voltage for rectified voltage. Specifically, the reference voltage generation circuit 163 includes a generation circuit 164 and a selection circuit 170. The generation circuit 164 generates the first to s-th divided voltages by dividing the hold voltage Vpeak. s is an integer of 3 or more. It is assumed that the voltage increases in order from the first divided voltage to the s-th divided voltage. A set value SETac for specifying any one of the first to s-th divided voltages is input from the threshold value determination circuit 168 to the selection circuit 170. The selection circuit 170 selects a divided voltage specified by the set value SETac from the first to s-th divided voltages and outputs the selected divided voltage as the reference voltage Vrefc.

The comparator 102 detects whether or not the full-wave rectified voltage VH is lower than the threshold voltage for rectified voltage by comparing the reference voltage Vrefc and the divided rectified voltage VHdiv, and outputs the detection result as a detection signal Vdetvh. Hereinafter, the threshold voltage for rectified voltage is Vth_ac. The reference voltage Vrefc is a voltage obtained by dividing the threshold voltage Vth_ac by the voltage dividing ratio of the rectified voltage divider circuit 161. That is, the threshold voltage Vth_ac is switched by the threshold value determination circuit 168 switching the reference voltage Vrefc.

The control circuit 110 outputs the signal St to the charge circuit 130 based on the charge mode setting signal Vdetvcc and the detection signal Vdetvh. Specifically, the detection circuit 160 outputs an active charge mode setting signal Vdetvcc when the power supply voltage Vcc is a voltage between the threshold voltage Vdet_L and the threshold voltage Vdet_U. The comparator 102 outputs an active detection signal Vdetvh when the full-wave rectified voltage VH is lower than the threshold voltage for rectified voltage. The control circuit 110 activates the signal St when the charge mode setting signal Vdetvcc is active and the detection signal Vdetvh is active. The logic level of the signal St that turns on the charging operation of the charge circuit 130 is activated.

The counter 166 counts the number of times that the detection signal Vdetvh becomes active, and outputs the count value CNT. Specifically, the counter 166 counts the number of times that the detection signal Vdetvh becomes active in the period from when the charge mode setting signal Vdetvcc becomes active until it becomes inactive next.

The threshold value determination circuit 168 determines the threshold voltage Vth_ac according to the count value CNT. Specifically, the threshold value determination circuit 168 determines the set value SETac for specifying the threshold voltage Vth_ac according to the count value CNT.

Figure 4:
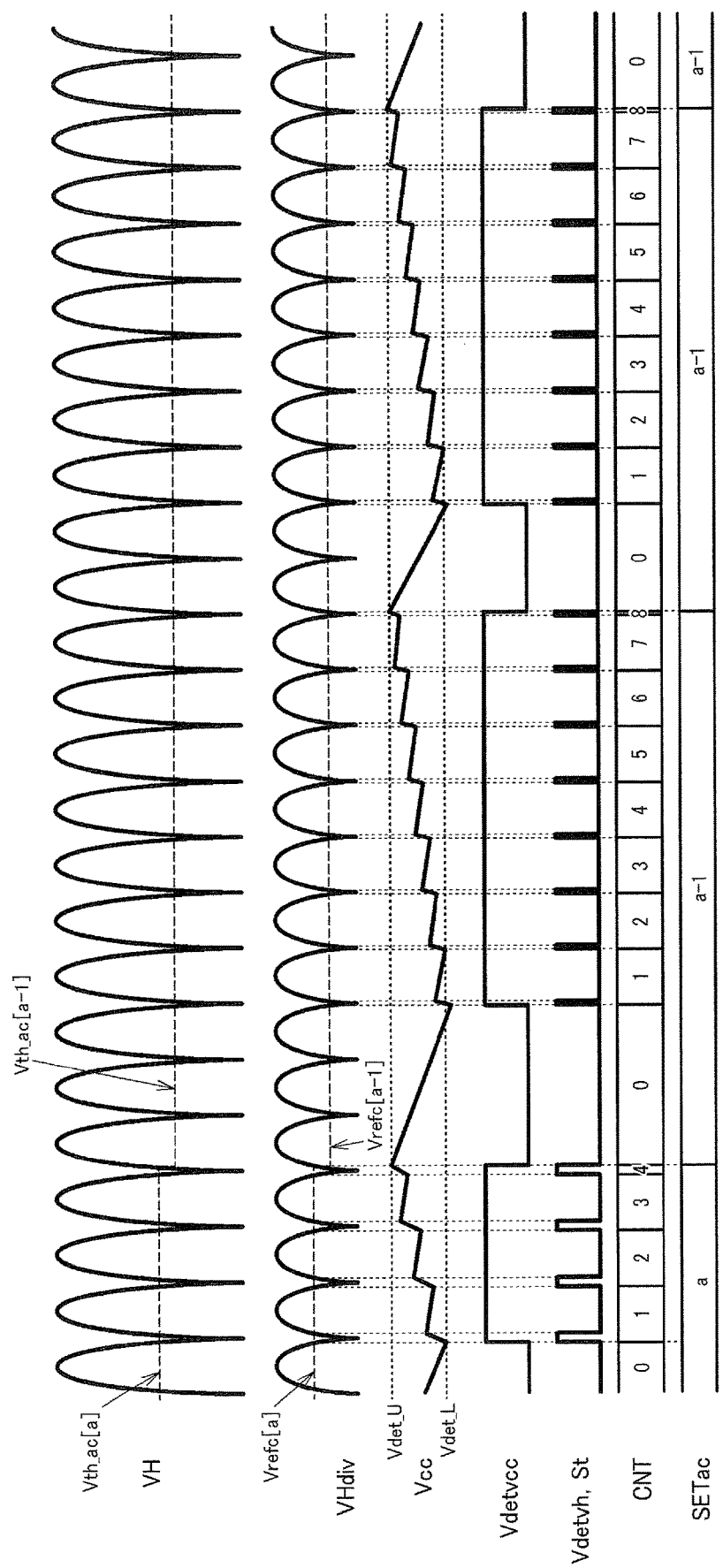
FIG. 4 is a waveform diagram for explaining the operation of the power supply control device according to the first embodiment.

FIG. 4 is a waveform diagram for explaining the operation of the power supply control device 100 according to the first embodiment. In FIG. 4, when the set value SETac=a, the threshold voltage for rectified voltage is indicated as Vth_ac[a], and the reference voltage is indicated as Vrefc[a]. a is an integer of 1 or more and s or less. In FIG. 4, the high level is active and the low level is inactive.

As shown in FIG. 4, when the detection circuit 160 detects that the power supply voltage Vcc is lower than the threshold voltage Vdet_L, the control circuit 110 enables the charge mode of the charge circuit 130. Specifically, when the detection circuit 160 detects that the power supply voltage Vcc is lower than the threshold voltage Vdet_L, the detection circuit 160 sets the charge mode setting signal Vdetvcc to a high level. When the charge mode setting signal Vdetvcc is at a high level, the control circuit 110 sets the charge circuit 130 to the charge mode. The charge mode is a mode in which charging control by the signal St is performed. A period in which the charge mode is set is called a charge mode period. In FIG. 4, the first charge mode period TCM1, the second charge mode period TCM2, and the third charge mode period TCM3 are set in the order in which the charge modes are enabled.

Assume that SETac=a is set as the initial value of the set value SETac. The reference voltage generation circuit 163 outputs a reference voltage Vrefc[a]. This corresponds to a threshold voltage Vth_ac[a]. The comparator 102 outputs a high level detection signal Vdetvh when the full-wave rectified voltage VH is lower than the threshold voltage Vth_ac[a]. The control circuit 110 outputs the same signal St as the detection signal Vdetvh to the charge circuit 130. The charge circuit 130 charges the capacitor C12 using the voltage VP when the signal St is at a high level.

In the first charge mode period TCM1, when the signal St is at a high level, the capacitor C12 is charged, so that the power supply voltage Vcc increases. On the other hand, since the power supply control device 100 is operated by the power supply voltage Vcc, when the signal St is at a low level, the power supply voltage Vcc decreases as the electric charge of the capacitor C12 is consumed in the power supply control device 100. The rate of increase of the power supply voltage Vcc in the first charge mode period TCM1 is determined by the balance between the increase and decrease of the power supply voltage Vcc.

When the detection circuit 160 detects that the power supply voltage Vcc has reached the threshold voltage Vdet_U, the control circuit 110 disables the charge mode. Specifically, when the detection circuit 160 detects that the power supply voltage Vcc has reached the threshold voltage Vdet_U, the detection circuit 160 sets the charge mode setting signal Vdetvcc to a low level. When the charge mode is disabled, the detection signal Vdetvh and the signal St are at a low level, and the charge circuit 130 does not charge the capacitor C12.

The charge current IP when charging the capacitor C12 in the charge mode causes power loss in the step-down circuit 120. The power loss is represented by (voltage at both ends of the circuit through which the charge current flows)× (charge current). For this reason, the charge current flows through the step-down circuit 120 and the charge circuit 130 only when the full-wave rectified voltage VH is low, so that the voltage at both ends of the step-down circuit 120 can be lowered, and the power loss in the step-down circuit 120 can be reduced.

However, if the threshold voltage Vth_ac is too low, the ability to charge the capacitor C12 is insufficient, and if the threshold voltage Vth_ac is too high, power loss in the step-down circuit 120 increases. An appropriate threshold voltage Vth_ac for making both compatible varies depending on the amplitude or frequency of the AC voltage. For example, the AC voltage standards for household power supply or the like vary by country or region, and therefore the threshold voltage Vth_ac suitable for the AC voltage of each standard is different.

Therefore, in the present embodiment, the charge control circuit 190 sets the charge capacity of the charge circuit 130 in the second charge mode period TCM2 in which the charge mode is subsequently enabled according to the length of the first charge mode period TCM1. The charge capacity is the amount of electric charge charged in the capacitor C12 in one pulse of the signal St. Since the amount of electric charge changes according to the threshold voltage Vth_ac, in the first embodiment, the charge capacity is represented by the threshold voltage Vth_ac. That is, setting the set value SETac corresponds to setting the charge capacity.

According to the present embodiment, the charge capacity is monitored by monitoring the length of the first charge mode period TCM1. Then, the charge capacity in the second charge mode period TCM2 is set according to the length of the first charge mode period TCM1. Thereby, an appropriate threshold voltage Vth_ac is set according to various AC voltages.

Hereinafter, a method for setting the charge capacity will be described. The counter 166 counts the number of charging operations in the first charge mode period TCM1. Specifically, the counter 166 counts the number of pulses of the signal St in the first charge mode period TCM1. Since FIG. 4 has 4 pulses, the count value is CNT=4. The length of the first charge mode period TCM1 is represented by the count value CNT. That is, since the cycle of the pulse of the signal St is the cycle of the full-wave rectified voltage VH, the length of the first charge mode period TCM1 can be expressed by the count value CNT that is the number of pulses of the signal St.

The threshold value determination circuit 168 sets the charge capacity in the second charge mode period TCM2 based on the count value CNT. Specifically, the threshold value determination circuit 168 decreases the set value SETac when the count value CNT is less than or equal to the first count value, and increases the set value SETac when the count value CNT is equal to or higher than a second count value that is higher than the first count value. Here, it is assumed that the higher the charge capacity increases as the set value SETac increases. Also, the first count value is 7 and the second count value is 16. In FIG. 4, since the count value CNT=4 in the first charge mode period TCM1, the threshold value determination circuit 168 decreases the set value SETac from a to a−1. The decrease width and the increase width may not be 1.

When the threshold value determination circuit 168 sets the set value SETac=a−1, the reference voltage generation circuit 163 outputs the reference voltage Vrefc[a−1]. This corresponds to the threshold voltage for rectified voltage being set to Vth_ac[ a−1]. Since Vth_ac[ a−1] is a lower voltage than Vth_ac[a], the charge capacity is decreased.

In the second charge mode period TCM2, since the charge capacity is lower than that in the first charge mode period TCM1, the length of the second charge mode period TCM2 is longer than the length of the first charge mode period TCM1. As described above, since the length of the charge mode period is represented by the count value CNT, the count value CNT increases. In FIG. 4, the count value CNT is increased from 4 to 8. Since the count value CNT=8 is larger than the first count value 7 and smaller than the second count value 16, the threshold value determination circuit 168 does not change the set value SETac. For this reason, also in the third charge mode period TCM3, the threshold voltage for rectified voltage is maintained at Vth_ac[a−1].

Figure 5:
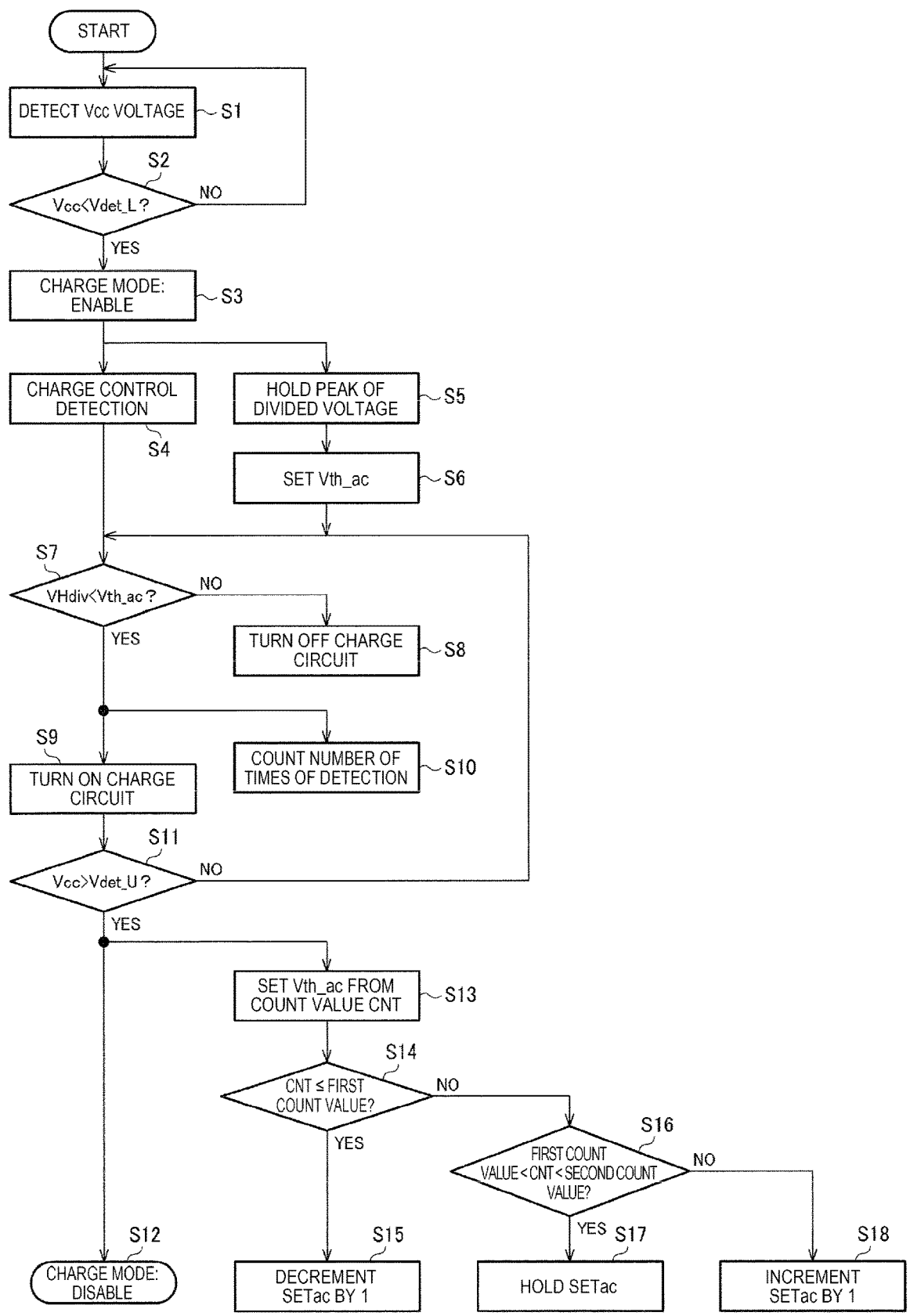
FIG. 5 is a flowchart for explaining the operation of the power supply control device according to the first embodiment.

FIG. 5 is a flowchart for explaining the operation of the power supply control device 100 according to the first embodiment. As the power supply control device 100 consumes power, the power supply voltage Vcc decreases. In step S1, the detection circuit 160 detects the power supply voltage Vcc. In step S2, when the power supply voltage Vcc is equal to or higher than the threshold voltage Vdet_L, the process returns to step S1. When the power supply voltage Vcc is lower than the threshold voltage Vdet_L, the control circuit 110 enables the charge mode in step S3.

In step S4, the control circuit 110 starts charge control detection. The charge control detection is a process shown in step S7 and subsequent steps. In step S5, the peak hold circuit 162 holds the peak of the divided rectified voltage. In step S6, threshold value determination circuit 168 sets threshold voltage Vth_ac. That is, the threshold value determination circuit 168 sets the set value SETac, and the reference voltage generation circuit 163 outputs the reference voltage Vrefc corresponding to the set value SETac. In the first step S6 after starting the processing shown in FIG. 5, the threshold value determination circuit 168 sets the set value SETac to the initial value. Thereby, the threshold voltage Vth_ac is set to the initial value.

In step S7, the comparator 102 detects whether or not the full-wave rectified voltage VH is lower than the threshold voltage Vth_ac. When the full-wave rectified voltage VH is equal to or higher than the threshold voltage Vth_ac, the control circuit 110 turns off the charging operation of the charge circuit 130 in step S8. That is, the charge current IP becomes zero. When the full-wave rectified voltage VH is lower than the threshold voltage Vth_ac, the control circuit 110 turns on the charging operation of the charge circuit 130 in step S9. That is, a constant current charge current IP is output. In step S10, the counter 166 counts the number of times of detection, that is, the number of times of charging.

In step S11, the detection circuit 160 detects whether or not the power supply voltage Vcc is higher than the threshold voltage Vdet_U. When the power supply voltage Vcc is equal to or lower than the threshold voltage Vdet_U, the process returns to step S7. When the power supply voltage Vcc is equal to or higher than the threshold voltage Vdet_U, the control circuit 110 sets the charge mode to disabled. Further, the threshold value determination circuit 168 sets the threshold voltage Vth_ac from the count value CNT. That is, in step S14, the threshold value determination circuit 168 determines whether or not the count value CNT is less than or equal to the first count value. When the count value CNT is less than or equal to the first count value, the set value SETac is decremented. When the count value CNT is larger than the first count value, the threshold value determination circuit 168 determines whether or not the count value CNT is smaller than the second count value. When the count value CNT is smaller than the second count value, the threshold value determination circuit 168 holds the set value SETac without change. When the count value CNT is greater than or equal to the second count value, the threshold value determination circuit 168 increments the set value SETac. After steps S12, S15, S17, and S18, the process returns to step S1.

In the first embodiment described above, the charge control circuit 190 sets the charge capacity in the second charge mode period TCM2 only in accordance with the length of the first charge mode period TCM1. However, "according to the length of the first charge mode period TCM1" is not limited to "according to only the length of the first charge mode period TCM1". That is, the charge control circuit 190 may set the charge capacity in the second charge mode period TCM2 according to the length of a plurality of charge mode periods including the first charge mode period TCM1. For example, k number of charge mode periods exist from the k number of charge mode periods before the second charge mode period TCM2 to the first charge mode period TCM1. The charge control circuit 190 may set the charge capacity in the second charge mode period TCM2 based on the average value or the like of the count values CNT in the k number of charge mode periods.

The operation when the power supply voltage Vcc has decreased after the power supply control device 100 is started has been described above. Even when the power supply control device 100 is activated, the power supply voltage Vcc is in a low state, but at this time, the intermittent charging as described above is not performed, and the capacitor C12 is continuously charged.

FIG. 6 is a waveform diagram for explaining the operation at the time of starting the power supply control device 100. When the full-wave rectified voltage VH is input to the node NVH, the step-down circuit 120 starts to step down the full-wave rectified voltage VH. Thereby, the voltage VP after step-down increases. While the full-wave rectified voltage VH is input to the node NVH, the voltage VP is constant.

The charge circuit 130 outputs a charge current IP based on the voltage VP, and charges the capacitor C12. As the capacitor C12 is charged, the power supply voltage Vcc increases. The power supply control device 100 includes a low voltage detection circuit (not shown). The low voltage detection circuit detects whether or not the power supply voltage Vcc exceeds a low voltage detection voltage Vuvlooff. For example, the voltage value of the power supply voltage Vcc at which the power supply control device 100 can operate is set as the low voltage detection voltage Vuvlooff.

When the low voltage detection circuit detects that the power supply voltage Vcc exceeds the low voltage detection voltage Vuvlooff, the control circuit 110 sets the signal St to low level to turn off the charge current IP. Also, the PWM control circuit 180 of FIG. 2 starts to operate, and the driver circuit 185 outputs the drive signal DRV. Thereby, on/off of the transistor Q11 of FIG. 1 is started. When the transistor Q11 is turned on/off, an electromotive voltage is generated in the auxiliary winding D, the capacitor C12 is charged with the electromotive voltage, and the power supply voltage Vcc is supplied to the power supply control device 100.

3. Second Embodiment

Figure 7:
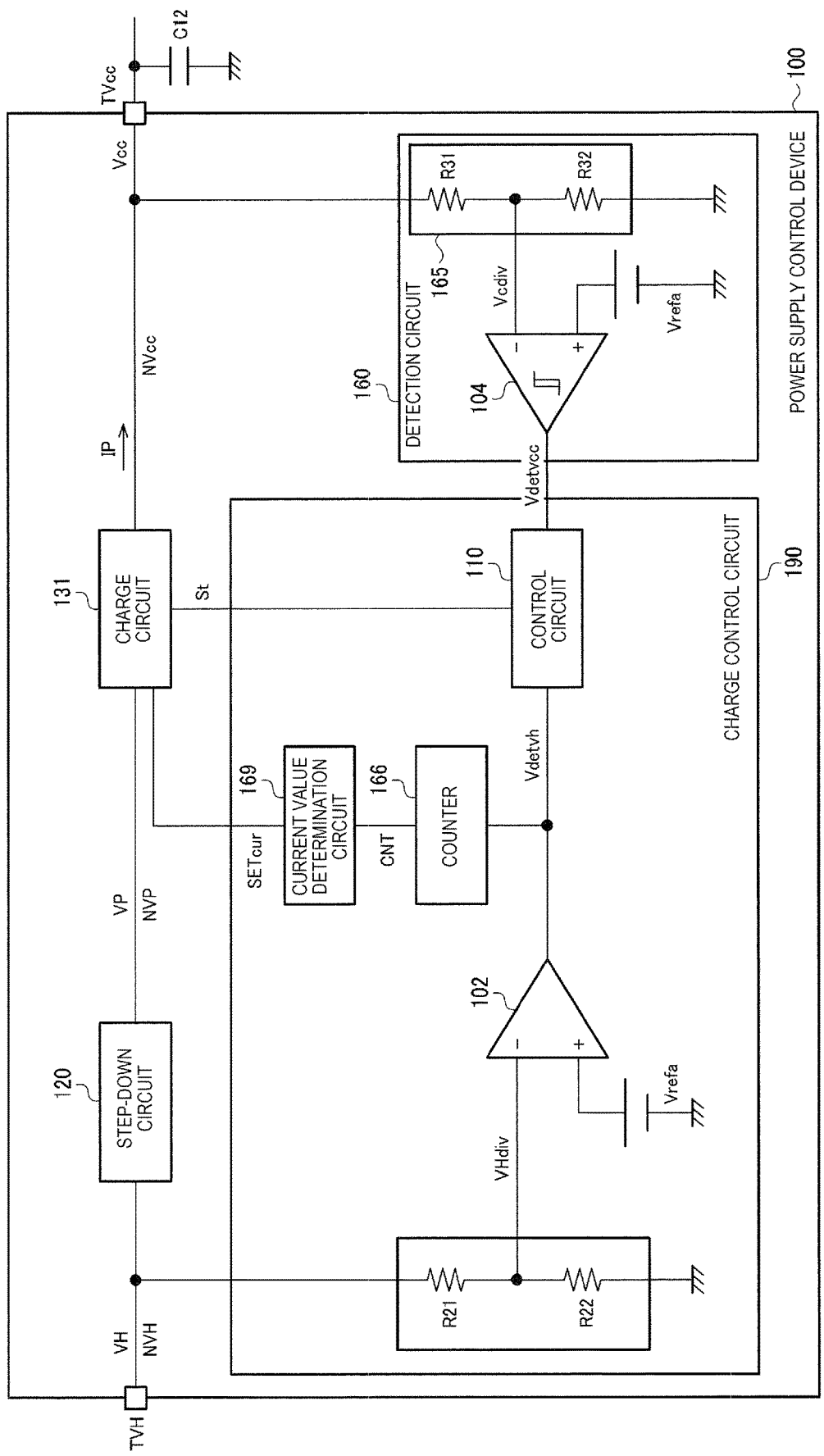
FIG. 7 is a configuration example of a power supply control device according to a second embodiment.

FIG. 7 is a configuration example of the power supply control device 100 according to a second embodiment. The power supply control device 100 includes the step-down circuit 120, a charge circuit 131, the charge control circuit 190, the detection circuit 160, the terminal TVH, and the power supply terminal TVcc. The same components as those already described are denoted by the same reference numerals, and description of the components will be omitted as appropriate.

In the second embodiment, when the power supply voltage Vcc decreases after startup, the capacitor C12 is charged using the full-wave rectified voltage VH as in the first embodiment. At this time, unlike the first embodiment, the charge control circuit 190 sets the charge capacity in the second charge mode period by setting the current value of the charge current IP in the second charge mode period according to the length of the first charge mode period. Accordingly, as in the first embodiment, an appropriate threshold voltage Vth_ac is set according to various AC voltages. Hereinafter, the second embodiment will be described in detail.

The charge control circuit 190 includes the rectified voltage divider circuit 161, the comparator 102, the counter 166, a current value determination circuit 169, the charge circuit 131, and the control circuit 110.

The comparator 102 compares the divided rectified voltage VHdiv with the reference voltage Vrefc, and outputs the comparison result as a detection signal Vdetvh. In the second embodiment, the reference voltage Vrefc is a constant voltage and is generated by, for example, the voltage source circuit 173 of FIG. 2. The control circuit 110 outputs the signal St having the same logic level as the detection signal Vdetvh to the charge circuit 131 during the charge mode period in which the charge mode setting signal Vdetvcc is active.

The counter 166 counts the number of pulses of the detection signal Vdetvh and outputs the count value CNT to the current value determination circuit 169. The current value determination circuit 169 determines the current value of the charge current IP according to the count value CNT. Specifically, the current value determination circuit 169 determines a set value SETcur that specifies the current value of the charge current IP according to the count value CNT. The charge circuit 131 sets the current value of the charge current IP based on the set value SETcur and outputs the charge current IP to the node NVcc. When the signal St is active, the charge circuit 131 outputs a charge current IP having a current value corresponding to the set value SETcur to the node NVcc, and charges the capacitor C12. When the signal St is inactive, the charge circuit 130 sets the charge current IP to zero.

Figure 8:
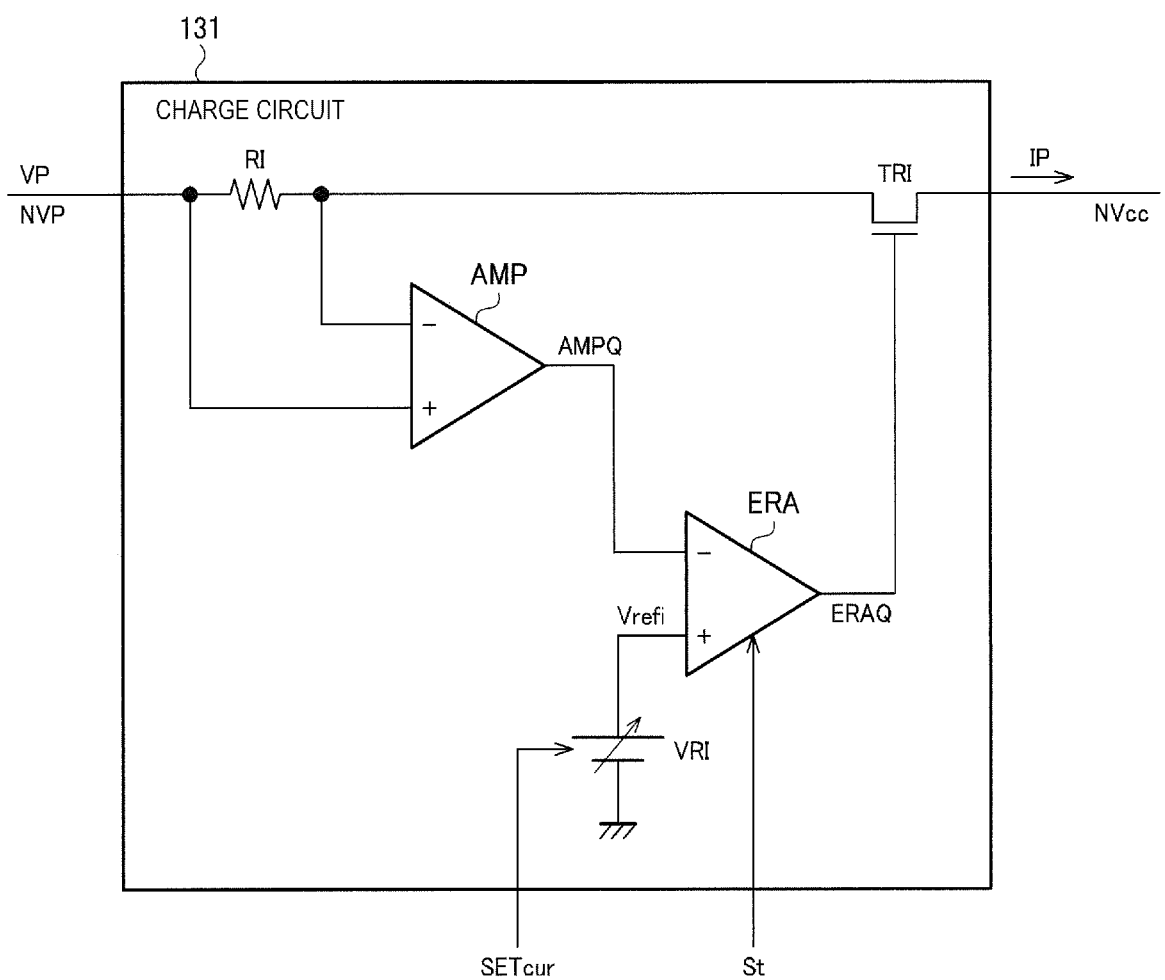
FIG. 8 is a detailed configuration example of the charge circuit according to the second embodiment.

FIG. 8 is a detailed configuration example of the charge circuit 131 according to the second embodiment. The charge circuit 131 includes the resistor RI, the transistor TRI, the amplifier circuit AMP, the error amplifier circuit ERA, and the reference voltage generation circuit VRI.

One end of the resistor RI is coupled to the node NVP, and the other end of the resistor RI is coupled to one of the source and the drain of the transistor TRI. The other of the source and the drain of the transistor TRI is coupled to the node NVcc.

The amplifier circuit AMP amplifies the potential difference between both ends of the resistor RI and outputs the result as a voltage AMPQ. The reference voltage generation circuit VRI generates a reference voltage Vrefi specified by the set value SETcur. Specifically, similar to the reference voltage generation circuit 163 of FIG. 3, the reference voltage generation circuit VRI outputs a divided voltage corresponding to the set value SETcur from the first to t-th divided voltages as the reference voltage Vrefi. t is an integer of 3 or more. The error amplifier circuit ERA amplifies the difference between the voltage AMPQ and the reference voltage Vrefi, and outputs the result as a voltage ERAQ to the gate of the transistor TRI. The transistor TRI outputs the charge current IP having a current value corresponding to the voltage ERAQ to the node NVcc.

Since the same current as the charge current IP flows through the resistor RI, the voltage AMPQ is a voltage corresponding to the charge current IP. When the voltage AMPQ is lower than the reference voltage Vrefi, the voltage ERAQ increases, so the charge current IP increases and the voltage AMPQ increases. When the voltage AMPQ is higher than the reference voltage Vrefi, the voltage ERAQ decreases, so the charge current IP decreases and the voltage AMPQ decreases. With such feedback, the current value of the charge current IP is set such that the voltage AMPQ and the reference voltage Vrefi are the same. When the reference voltage Vrefi is switched by the set value SETcur, the current value of the charge current IP is also switched.

Figure 9:
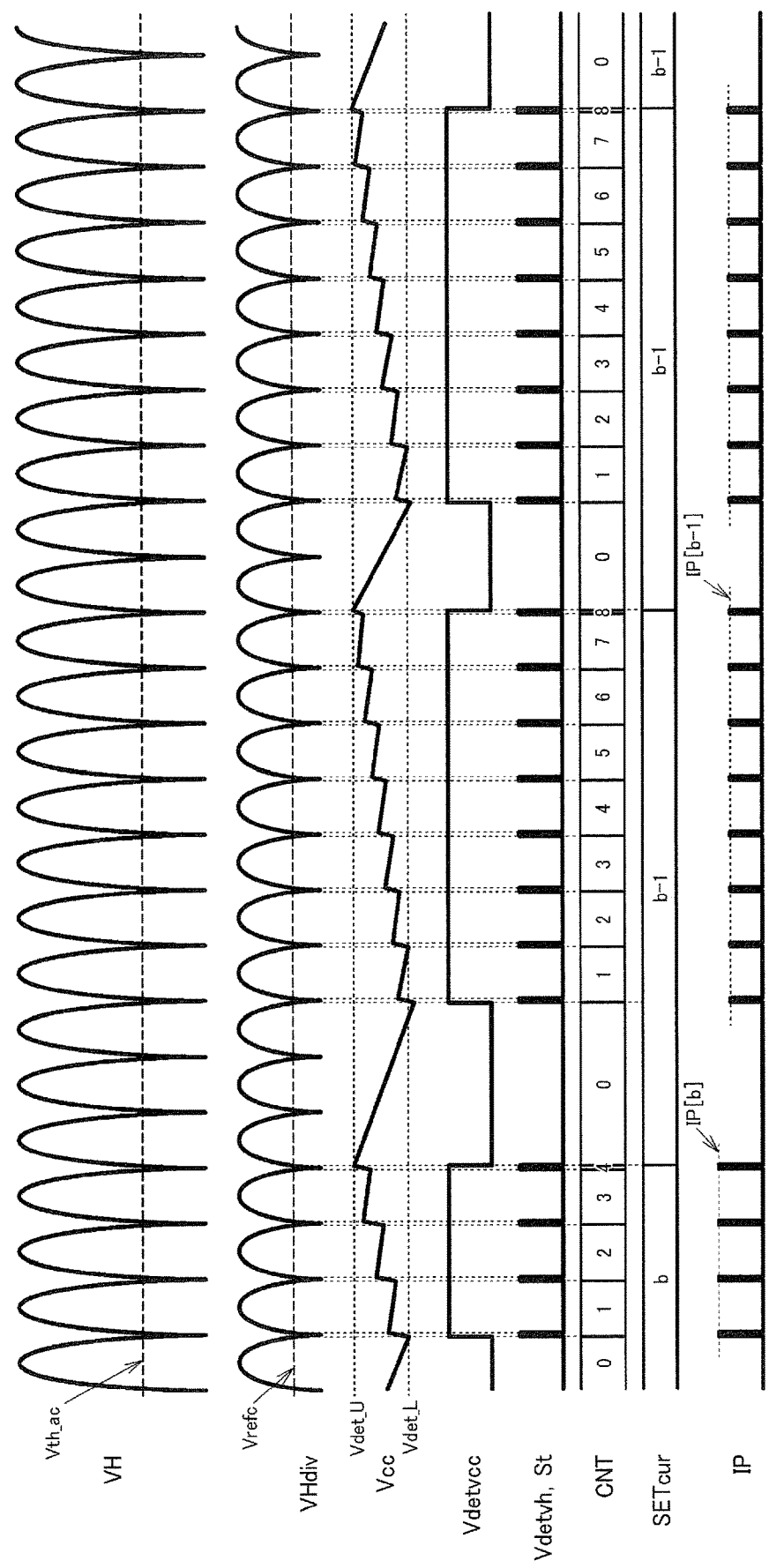
FIG. 9 is a waveform diagram for explaining the operation of the power supply control device according to the second embodiment.

FIG. 9 is a waveform diagram for explaining the operation of the power supply control device 100 according to the second embodiment. In FIG. 9, the charge current when the set value SETcur=b is indicated as IP[b]. b is an integer of 1 or more and t or less. In FIG. 9, the high level is active and the low level is inactive.

Assume that SETcur=b is set as the initial value of the set value SETcur. The charge circuit 131 sets the charge current to IP[b]. When the full-wave rectified voltage VH is lower than the threshold voltage Vth_ac, the signal St becomes high level. The charge circuit 130 charges the capacitor C12 with the charge current IP[b] when the signal St is at a high level.

The counter 166 counts the number of pulses of the signal St in the first charge mode period TCM1. Since FIG. 9 has 4 pulses, the count value is CNT=4. The current value determination circuit 169 determines the set value SETcur in the second charge mode period TCM2 based on the count value CNT. Specifically, the current value determination circuit 169 decreases the set value SETcur when the count value CNT is less than or equal to the first count value, increases the set value SETcur when the count value CNT is higher than or equal to the second count value higher than the first count value, and maintains the set value SETcur when the count value CNT is larger than the first count value and smaller than the second count value. Here, it is assumed that the charge current IP increases as the set value SETcur increases. Also, the first count value is 7 and the second count value is 16. In FIG. 9, since the count value CNT=4 in the first charge mode period TCM1, the current value determination circuit 169 decreases the set value SETcur from b to b−1. The decrease width and the increase width may not be 1.

In the second charge mode period TCM2, the charge current is IP[b−1], but other operations are the same as those in the first charge mode period TCM1. Since the count value is CNT=8 in the second charge mode period TCM2, the current value determination circuit 169 maintains the set value SETcur at b−1. In the third charge mode period TCM3, the charge current is IP[b−1].

4. Third to Sixth Embodiment

When the load that consumes the charge voltage of the capacitor C12 is heavy, there is a problem that since charging of the capacitor C12 by turning on the charge circuit 130 is not in time, the charge voltage decreases, and the power supply control device 100 using the charge voltage as a power source becomes inoperable. Hereinafter, an embodiment for solving this problem will be described.

Figure 10:
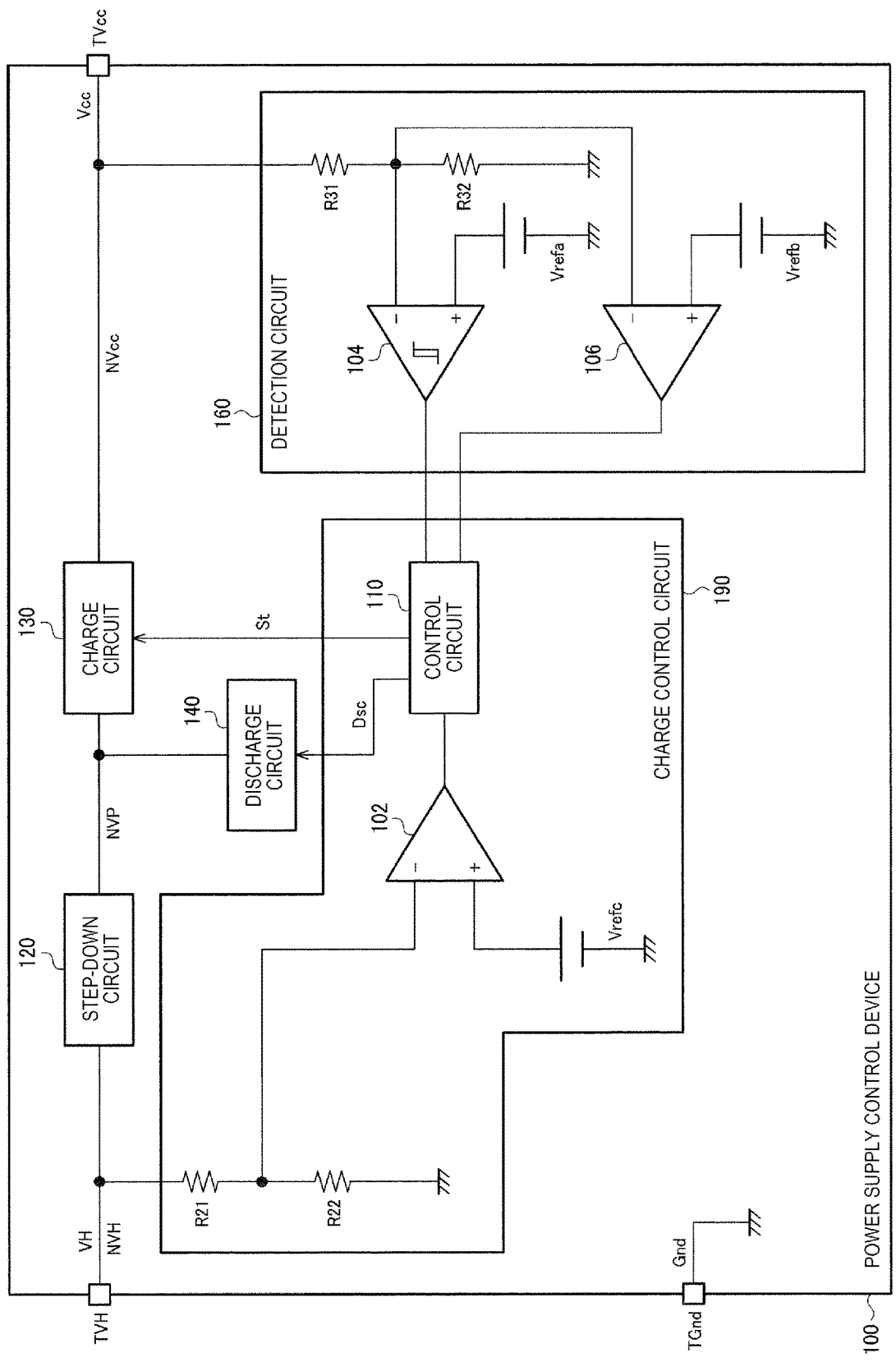
FIG. 10 is a diagram showing a power supply control device according to a third embodiment.

FIG. 10 is a diagram showing an example of the power supply control device 100. As shown in FIG. 10, the power supply control device 100 includes the charge control circuit 190, the detection circuit 160, the step-down circuit 120, the charge circuit 130, and a discharge circuit 140. The charge control circuit 190 includes the resistors R21 and R22, the comparator 102, and the control circuit 110. The detection circuit 160 includes the Schmitt trigger circuit 104, a comparator 106, and the resistors R31 and R32.

The step-down circuit 120 steps down the full-wave rectified voltage VH and applies it to the node NVP. The full-wave rectified voltage VH is a voltage input to the node NVH. The node NVH is an example of a first node. When charge circuit 130 is turned on, a constant current flows from the node NVP to the node NVcc to charge the capacitor C12. The node NVcc is an example of a second node and is also called a power supply voltage node. The discharge circuit 140 discharges the electric charge accumulated in the capacitance parasitic to the node NVH via the node NVP when turned on.

Figure 11:
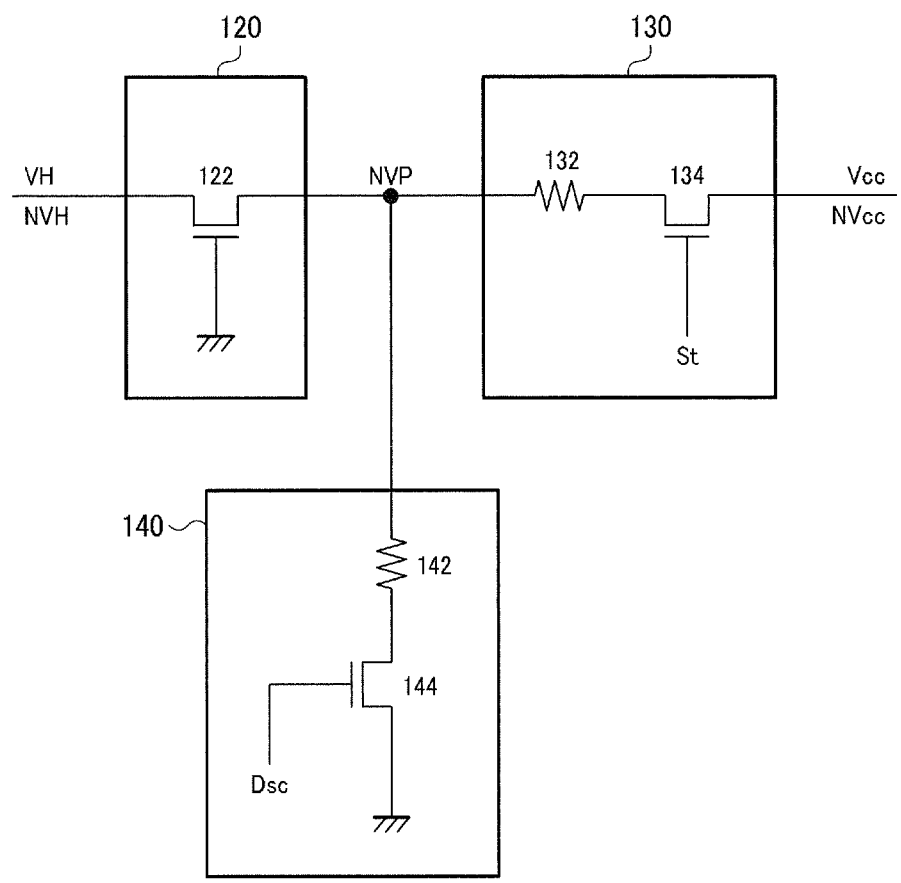
FIG. 11 is a diagram showing a step-down circuit and the like in the power supply control device.

FIG. 11 is a diagram showing an example of the configuration of the step-down circuit 120, the charge circuit 130, and the discharge circuit 140.

In FIG. 11, the step-down circuit 120 is constituted by, for example, a JFET transistor 122. The step-down circuit 120 steps down the full-wave rectified voltage VH by the pinch-off component of the transistor 122 and applies it to the node NVP.

The charge circuit 130 includes, for example, a resistor 132 and a transistor 134 coupled in series between the node NVP and the node NVcc. A signal St output from the control circuit 110 is supplied to the gate node of the transistor 134, and on/off of charging of the capacitor C12 via the node NVcc is controlled by the signal St. When the charge circuit 130 is turned on, the full-wave rectified voltage VH is applied to the node NVcc through the step-down by the step-down circuit 120.

The discharge circuit 140 includes, for example, a resistor 142 and a transistor 144 coupled in series between the node NVP and the node Gnd. A signal Dsc output from the control circuit 110 is supplied to the gate node of the transistor 144, and on/off is controlled by the signal Dsc. When the transistor 144 is turned on, the electric charge accumulated in the capacitance parasitic on the node NVH is discharged to the node Gnd through the transistor 122 and the resistor 142.

Returning to FIG. 10 again, the resistors R21 and R22 divide the full-wave rectified voltage VH and apply it to the negative input terminal (−) of the comparator 102. The reference voltage Vrefc is applied to the positive input terminal (+) of the comparator 102.

The comparator 102 outputs a high level signal when the voltage at the negative input terminal (−) is less than the reference voltage Vrefc applied to the positive input terminal (+), and outputs a low level signal otherwise. Here, the reference voltage Vrefc corresponds to a voltage obtained by dividing the full-wave rectified voltage VH by the resistors R21 and R22 when the full-wave rectified voltage VH is the threshold voltage Vth_ac. Therefore, the comparator 102 is an example of a first detection circuit that detects whether or not the full-wave rectified voltage VH is less than the threshold voltage Vth_ac. The threshold voltage Vth_ac is an example of the first voltage. The threshold voltage Vth_ac is also called a threshold voltage for rectified voltage.

The resistors R31 and R32 divide the power supply voltage Vcc and apply it to the negative input terminal (−) of the Schmitt trigger circuit 104 and the negative input terminal (−) of the comparator 106. The power supply voltage Vcc is the voltage of the node NVcc. The reference voltage Vrefa is applied to the positive input terminal (+) of the Schmitt trigger circuit 104, and the reference voltage Vrefb is applied to the positive input terminal (+) of the comparator 106.

The Schmitt trigger circuit 104 is a hysteresis comparator, and the threshold value applied when the voltage at the negative input terminal (−) is decreasing is different from the threshold value applied when it is increasing. Specifically, when the voltage at the negative input terminal (−) is decreasing, the Schmitt trigger circuit 104 outputs a high level signal when the voltage at the negative input terminal (−) becomes less than the voltage (Vrefa−α) obtained by shifting the reference voltage Vrefa applied to the positive input terminal (+) to the lower side by α. When the voltage at the negative input terminal (−) is increasing, the Schmitt trigger circuit 104 outputs a low level signal when the voltage at the negative input terminal (−) becomes equal to or higher than the voltage (Vrefa+α) obtained by shifting the reference voltage Vrefa applied to the positive input terminal (+) to the higher side by α.

Here, the voltage (Vrefa−α) corresponds to a voltage obtained by dividing the voltage of the node NVcc by the resistors R31 and R32 when the power supply voltage Vcc is the threshold voltage Vdet_L. Similarly, the voltage (Vrefa+a) corresponds to a voltage obtained by dividing the power supply voltage Vcc by the resistors R31 and R32 when the power supply voltage Vcc is the threshold voltage Vdet_U.

The Schmitt trigger circuit 104 is an example of a second detection circuit which detects whether or not the power supply voltage Vcc decreases and the power supply voltage Vcc becomes less than the threshold voltage Vdet_L, and at the same time, detects whether or not the power supply voltage Vcc increases and the power supply voltage Vcc becomes equal to or higher than the threshold voltage Vdet_U.

The comparator 106 outputs a high level signal when the voltage at the negative input terminal (−) is less than the reference voltage Vrefb applied to the positive input terminal (+), and outputs a low level signal otherwise. Here, the reference voltage Vrefb corresponds to a voltage obtained by dividing the power supply voltage Vcc by the resistors R31 and R32 when the power supply voltage Vcc is the threshold voltage Vmin_Lmt. Therefore, the comparator 106 is an example of a third detection circuit that detects whether or not the power supply voltage Vcc is less than the threshold voltage Vmin_Lmt.

The threshold voltages Vdet_L, Vdet_U, and Vmin_Lmt have the following relationship.

$$V\min\_Lmt < V\det\_L < V\det\_U$$

Here, the threshold voltage Vdet_L is an example of the second voltage, the threshold voltage Vdet_U is an example of the third voltage, and the threshold voltage Vmin_Lmt is an example of the fourth voltage. Vdet_L is also called a first threshold voltage, and Vdet_U is also called a second threshold voltage.

The control circuit 110 controls the charge circuit 130 and the discharge circuit 140 based on the detection results by the comparators 102 and 106 and the Schmitt trigger circuit 104. Although details will be described later, the control circuit 110 turns on the discharge circuit 140 during a period in which the power supply voltage Vcc increases to the threshold voltage Vdet_U after decreasing to the threshold voltage Vdet_L and turns on the charge circuit 130 when the full-wave rectified voltage VH is lower than the threshold voltage Vth_ac during the same period.

However, when the power supply voltage Vdet_L and the power supply voltage Vcc becomes less than the threshold voltage Vmin_Lmt, the control circuit 110 turns on the charge circuit 130 regardless of the voltage of the node NVH, that is, regardless of the detection result of the comparator 102. The control circuit 110 turns off the charge circuit 130 when the power supply voltage Vcc rises to the threshold voltage Vdet_U.

Here, in the present embodiment, a process in which the configuration as shown in FIG. 10 is adopted will be described.

Figure 12:
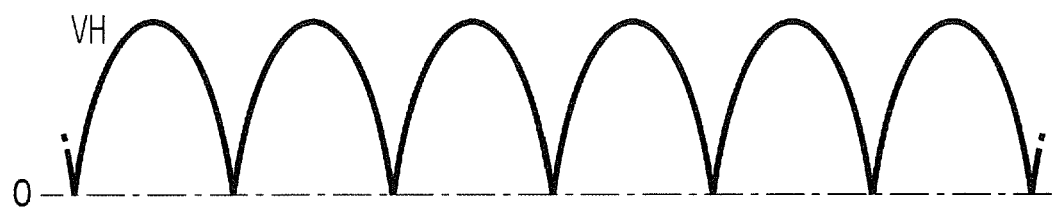
FIG. 12 is a diagram showing a voltage waveform of a full-wave rectified voltage input to the power supply control device.

The control circuit 110 charges the capacitor C12 using the full-wave rectified voltage VH when the power supply voltage Vcc is insufficient, such as immediately after power-on. Specifically, when the voltage of the power supply voltage Vcc is insufficient, the control circuit 110 turns on the charge circuit 130 when the voltage waveform applied to the node NVH, specifically, the input of the waveform of the full-wave rectified voltage VH as shown in FIG. 12 is detected. As a result, the full-wave rectified voltage VH applied to the node NVH is stepped down by the step-down circuit 120 and charged to the capacitor C12, so that the power supply voltage Vcc at the node NVcc increases. When the control circuit 110 detects that the power supply voltage Vcc reaches, for example, the threshold voltage Vdet_U, the control circuit 110 turns off the charge circuit 130 and starts turning on/off the transistor Q11. By this switching, a voltage is induced in the auxiliary winding D, and the induced voltage is rectified by the diode d13 and charged in the capacitor C12.

If an abnormal state or the like is detected while the transistor Q11 is being switched, the control circuit 110 stops turning on/off the transistor Q11. When the on/off of the transistor Q11 is stopped, no voltage is induced in the auxiliary winding D, so that the charge voltage of the capacitor C12, that is, the voltage of the power supply voltage Vcc decreases.

Even if the on/off of the transistor Q11 is stopped due to an abnormal state or the like, it is necessary to control the power supply voltage Vcc so as to be within a predetermined range, specifically, a voltage range that can be controlled by the IC.

Figure 23:
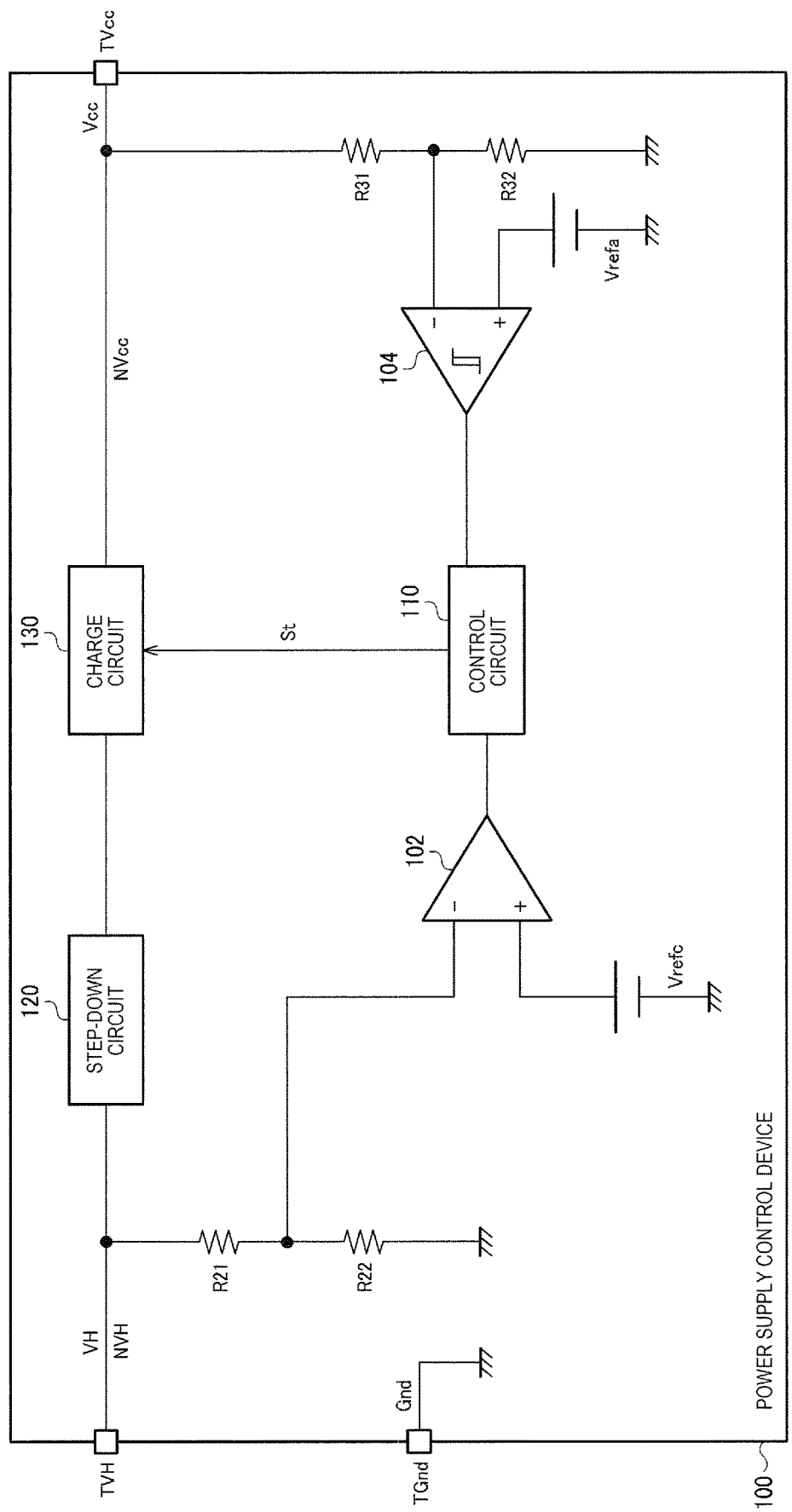
FIG. 23 is a diagram showing a power supply control device according to a comparative example.

Therefore, in the comparative example with respect to the present embodiment, it has been considered to execute the following control. FIG. 23 is a diagram showing a power supply control device according to a comparative example and does not have the comparator 106 or the discharge circuit 140 as compared with the configuration of the present embodiment of FIG. 10. Further, since the control circuit 110 does not have the comparator 106 or the discharge circuit 140, the control content is also different from that of FIG. 10.

In the comparative example, when the power supply voltage Vcc decreases and becomes less than the threshold voltage Vdet_L, the control circuit 110 turns on the charge circuit 130.

As a result, the full-wave rectified voltage VH applied to the node NVH is stepped down by the step-down circuit 120, applied to the node NVcc via the turned on charge circuit 130, and charged in the capacitor C12, so that the power supply voltage Vcc increases. When the power supply voltage Vcc becomes equal to or higher than the threshold voltage Vdet_U, the control circuit 110 turns off the charge circuit 130. Thereby, even when the on/off of the transistor Q11 is stopped, the power supply voltage Vcc is controlled so as to be within the range of the threshold voltage Vdet_L or higher and less than the threshold voltage Vdet_U.

However, in such control, since the loss due to the step-down circuit 120, particularly the loss when the full-wave rectified voltage VH is relatively high, is large, it is considered that the following control is executed. Specifically, as shown in FIG. 13, the control circuit 110 turns on the charge circuit 130 when the full-wave rectified voltage VH is less than the threshold voltage Vth_ac during the period in which the power supply voltage Vcc falls below the threshold voltage Vdet_L and is less than the threshold voltage Vdet_U.

Figure 13:
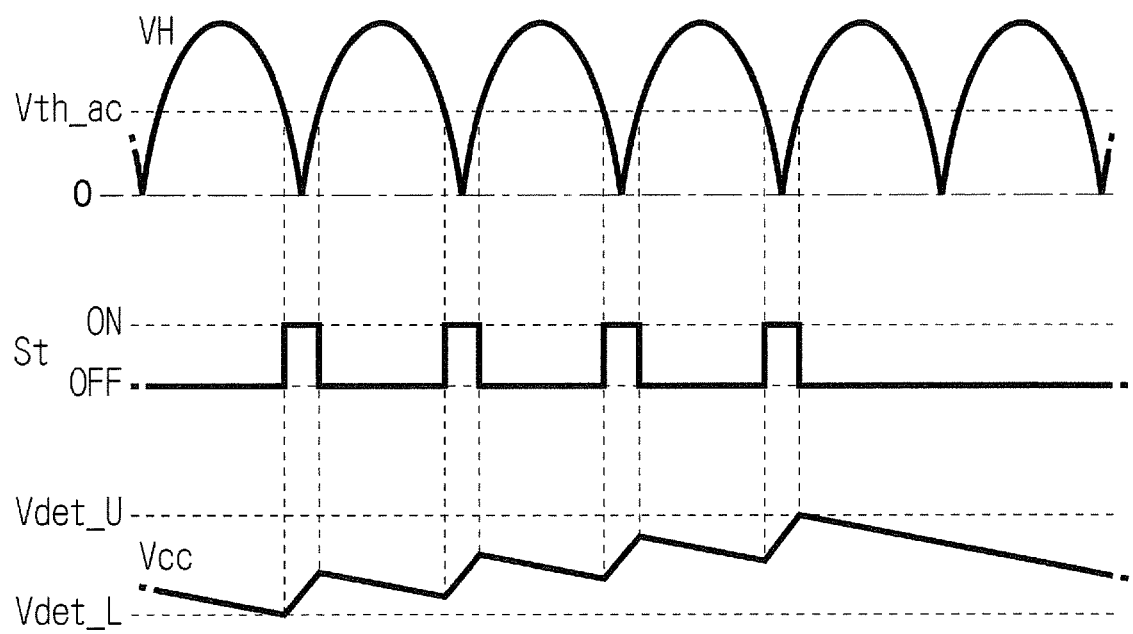
FIG. 13 is a diagram showing a charging operation with respect to the full-wave rectified voltage and a power supply voltage.

In FIG. 13, the signal St does not indicate a logic level, but indicates an on/off state of the charge circuit 130 based on the signal St.

By turning on the charge circuit 130 as described above, the loss in the step-down circuit 120 is reduced, so that it is considered that low power consumption can be achieved.

Figure 14:
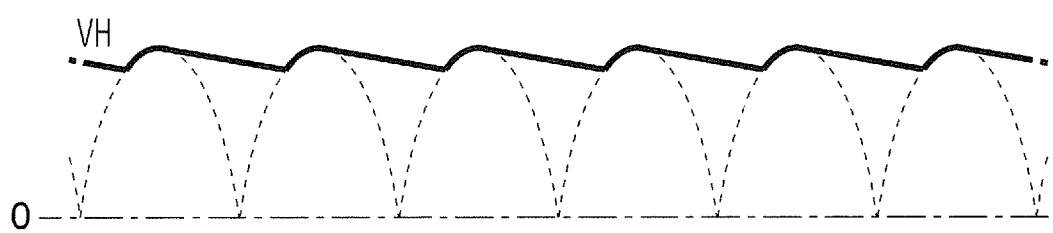
FIG. 14 is a diagram showing a voltage waveform of the full-wave rectified voltage.

However, such control assumes that the voltage waveform at the node NVH is an ideal full-wave rectified waveform. When the charge circuit 130 is actually turned off, the load on the node NVcc side is reduced as viewed from the node NVH, so that a capacitance component parasitic on the node NVH becomes apparent. As shown in FIG. 14, due to the capacitance component when the charge circuit 130 is turned off, the follow-up property at the fall of the full-wave rectification deteriorates in the waveform of the full-wave rectified voltage VH input to the node NVH.

Figure 15:
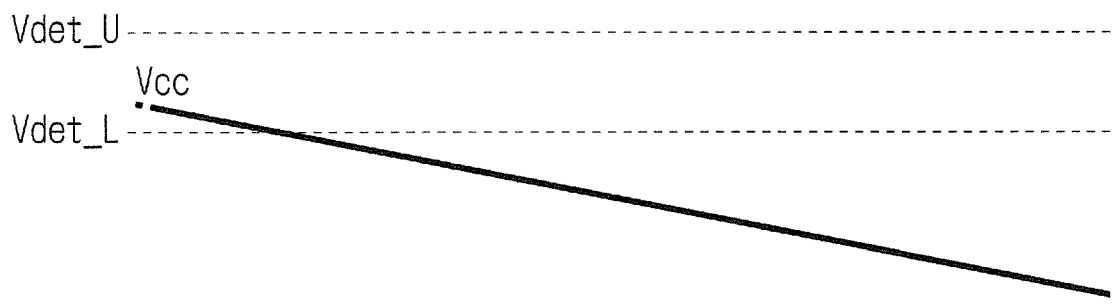
FIG. 15 is a diagram showing a charging operation with respect to the full-wave rectified voltage.

If the follow-up property of the node NVH is deteriorated due to the capacitance component, the full-wave rectified voltage VH may not be less than the threshold voltage Vth_ac as shown in FIG. 15. In this case, since the control circuit 110 cannot turn on the charge circuit 130, there is a possibility that the voltage of the power supply voltage Vcc continues to decrease, the power supply control device 100 becomes inoperable, and the switching power supply 1 goes down.

Therefore, the following configuration was considered. Specifically, a configuration in which the discharge circuit 140 is provided in the configuration shown in FIG. 23 and a function for controlling the discharge circuit 140 is added to the control circuit 110 has been considered.

Figure 16:
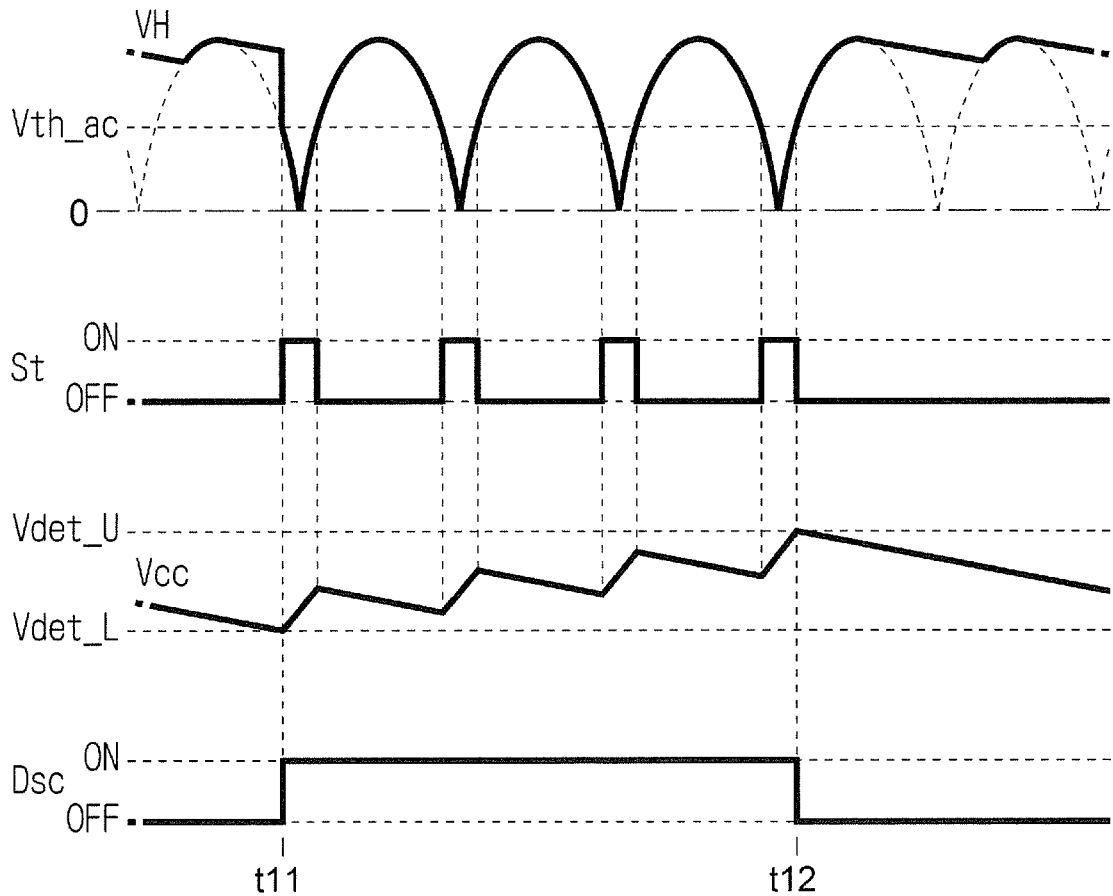
FIG. 16 is a diagram showing a charging operation and a discharging operation with respect to the full-wave rectified voltage and the power supply voltage.

In such a configuration, as shown in FIG. 16, the control circuit 110 turns on the discharge circuit 140 when the power supply voltage Vcc falls below the threshold voltage Vdet_L and is in a range less than the threshold voltage Vdet_U.

In FIG. 16, the signal Dsc does not indicate the logic level, but indicates the on/off state of the discharge circuit 140 based on the signal Dsc.

When the discharge circuit 140 is turned on, the electric charge accumulated in the capacitance component parasitic on the node NVH is discharged, so that the follow-up property at the fall of full-wave rectification is improved in the waveform of the full-wave rectified voltage VH, which is in a good state. In this state, the control circuit 110 turns on the charge circuit 130 when the full-wave rectified voltage VH is less than the threshold voltage Vth_ac.

Specifically, as shown in FIG. 16, when the power supply voltage Vcc decreases and reaches the threshold voltage Vdet_L at time t11 and the discharge circuit 140 is turned on, the follow-up property at the fall of the full-wave rectification is good in the waveform of the full-wave rectified voltage VH by turning on the discharge circuit 140. In this state, when full-wave rectified voltage VH is less than threshold voltage Vth_ac, the charge circuit 130 is turned on, the power supply voltage Vcc increases, reaches the threshold voltage Vdet_U at time t12, and the discharge circuit 140 is turned off.

With this configuration, it was considered that even when the on/off of the transistor Q11 was stopped, it was possible to reduce the power consumption for the control to keep the power supply voltage Vcc within the voltage range.

However, in such a control, when the load of the node NVcc, that is, the load using the charge voltage of the capacitor C12 is heavy, the capacitor C12 cannot be charged in time just by turning on the charge circuit 130 when the full-wave rectified voltage VH is less than the threshold voltage Vth_ac, the power supply voltage Vcc continues to decrease, and the power supply control device 100 may become inoperable.

Therefore, in the present embodiment, the comparator 106 is provided, and a function for controlling the charge circuit 130 is added to the control circuit 110 inconsideration of the detection result of the comparator 106. Specifically, when the power supply voltage Vcc further decreases from the threshold voltage Vdet_L and becomes less than the threshold voltage Vmin_Lmt, the control circuit 110 turns on the charge circuit 130 regardless of the full-wave rectified voltage VH input to the node NVH. That is, when the power supply voltage Vcc becomes less than the threshold voltage Vmin_Lmt, the control circuit 110 ignores the detection result of the comparator 102 and turns on the charge circuit 130.

Figure 17:
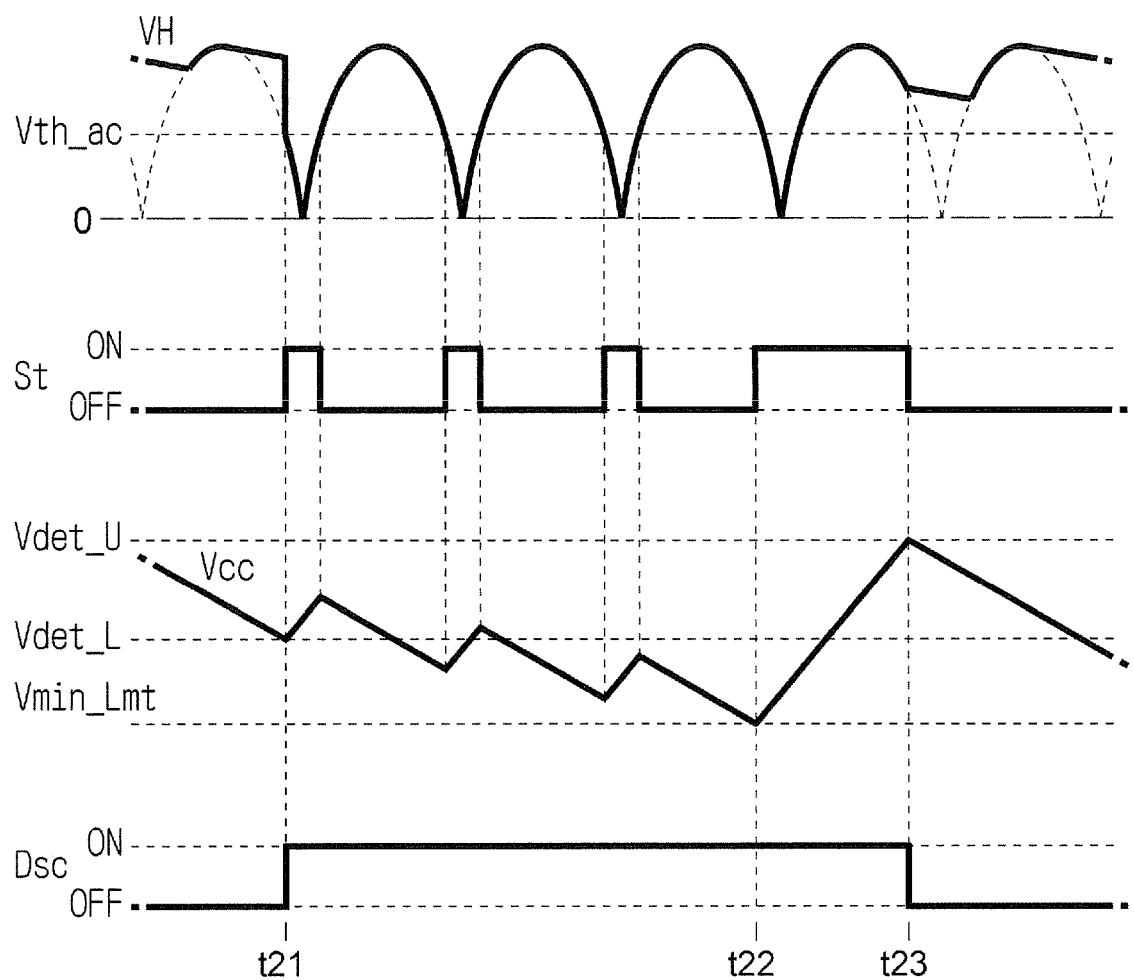
FIG. 17 is a diagram showing a charging operation and a discharging operation with respect to the full-wave rectified voltage and the power supply voltage.

FIG. 17 is a diagram illustrating an operation by the power supply control device 100 according to the present embodiment, and is a diagram specifically showing the charge circuit 130 and the discharging operation with respect to the full-wave rectified voltage VH and the power supply voltage Vcc. As shown in FIG. 17, if the full-wave rectified voltage VH is less than the threshold voltage Vth_ac when the power supply voltage Vcc decreases and reaches the threshold voltage Vdet_L at time t21, the charge circuit 130 turns on. With this on, the capacitor C12 is charged and the power supply voltage Vcc temporarily increases, but when the load of the node NVcc is large, the power supply voltage Vcc continues to decrease because the voltage decrease due to the load consumption is larger than the voltage increase. When the power supply voltage Vcc becomes less than the threshold voltage Vmin_Lmt at time t22, the charge circuit 130 is turned on regardless of the full-wave rectified voltage VH input to the node NVH, and the power supply voltage Vcc continues to increase. When the power supply voltage Vcc reaches the threshold voltage Vdet_U at time t23, the charge circuit 130 and the discharge circuit 140 are turned off.

According to the power supply control device 100 according to the third embodiment, if the load on the node NVcc is relatively light, the power supply voltage Vcc is controlled in the range of the threshold voltage Vdet_L or more and less than the threshold voltage Vdet_U with low power consumption. Further, according to the power supply control device 100 according to the third embodiment, when the load of the node NVcc is relatively heavy, it is possible to suppress the inoperability of the power supply control device 100 due to the voltage drop of the power supply voltage Vcc.

As in the third embodiment, when the power supply voltage Vcc is lower than the threshold voltage Vmin_Lmt, according to the configuration in which the charge circuit 130 is turned on regardless of the full-wave rectified voltage VH input to the node NVH, the power supply voltage Vcc can be increased in a relatively short time. However, turning on the charge circuit 130 with the full-wave rectified voltage VH being high has a large loss as described above. From the viewpoint of reducing power consumption, it can be said that there is room for improvement.

A fourth embodiment in which this point is improved will be described.

Figure 18:
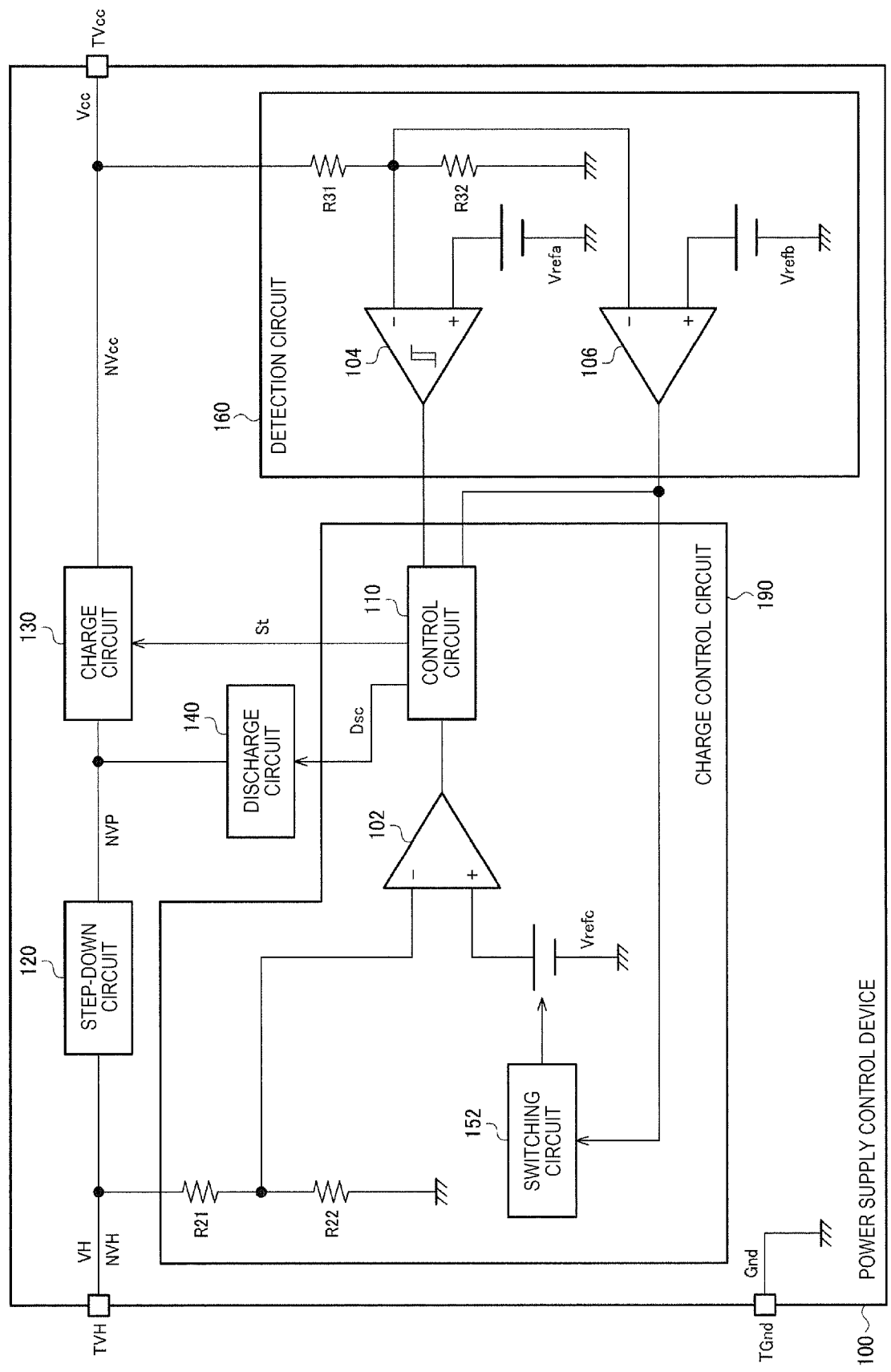
FIG. 18 is a diagram showing a power supply control device according to a fourth embodiment.

FIG. 18 is a diagram showing the power supply control device 100 according to a fourth embodiment. In the fourth embodiment shown in FIG. 18, a switching circuit 152 is provided in contrast to the third embodiment shown in FIG. 10.

When the comparator 106 detects that the power supply voltage Vcc is less than the threshold voltage Vmin_Lmt, the switching circuit 152 switches the reference voltage Vrefc at the positive input terminal (+) in the comparator 102 to a voltage (Vrefc+ΔV) shifted to the higher side by a predetermined voltage ΔV.

The voltage (Vrefc+ΔV) corresponds to a voltage obtained by dividing the full-wave rectified voltage VH by the resistors R21 and R22 when the full-wave rectified voltage VH is a voltage (Vth_ac+Δβ) that is higher than the threshold voltage Vth_ac by the voltage β.

Figure 19:
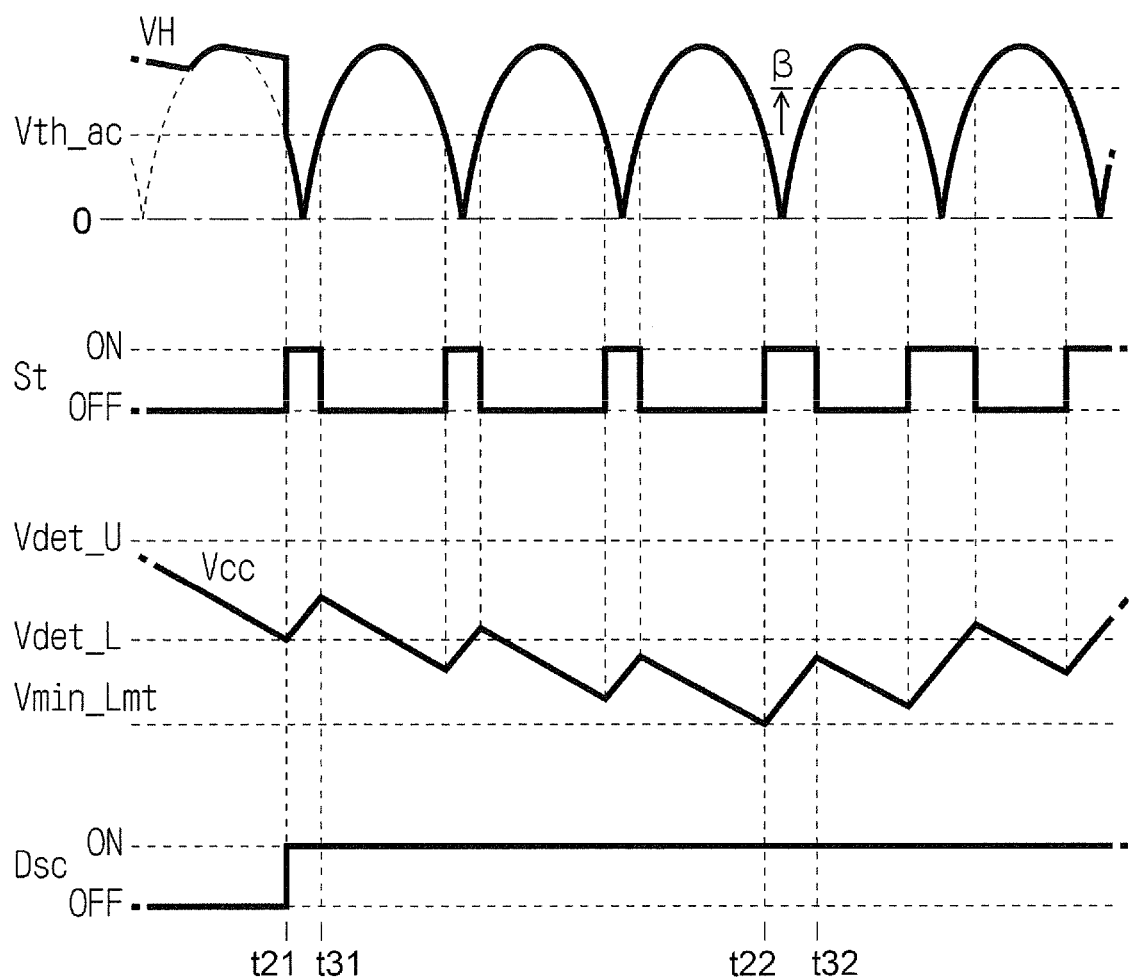
FIG. 19 is a diagram showing a charging operation and a discharging operation with respect to the full-wave rectified voltage and the power supply voltage.

FIG. 19 is a diagram showing an operation by the power supply control device 100 according to the fourth embodiment. As shown in FIG. 19, when the power supply voltage Vcc becomes less than the threshold voltage Vdet_L at time t21, the charge circuit 130 is turned on. However, when the load on the node NVcc is heavy, the power supply voltage Vcc still decreases.

When the power supply voltage Vcc becomes less than the threshold voltage Vmin_Lmt at time t22, the switching circuit 152 switches the reference voltage Vrefc to (Vref+ΔV). By this switching, the reference for comparing the full-wave rectified voltage VH in the comparator 102 is increased from the threshold voltage Vth_ac to (Vth_ac+Δβ).

Therefore, in the fourth embodiment, if the time length per one time when the charge circuit 130 is turned on is a threshold value (Vth_ac+Δβ), for example, the period is from time t22 to time t32, which is longer than, for example, the period from time t21 to time t31 when the threshold voltage is Vth_ac.

Therefore, according to the fourth embodiment, compared with the third embodiment, although the degree of voltage increase of the power supply voltage Vcc is inferior to the third embodiment, the loss due to the charge circuit 130 being turned on when the full-wave rectified voltage VH is high can be suppressed, so that the power consumption can be reduced accordingly.

According to the fourth embodiment, power consumption can be reduced compared to the third embodiment. However, when the load is extremely heavy, even if the reference for comparing the full-wave rectified voltage VH is switched to a higher voltage by the switching circuit 152, the possibility that the voltage at the node NVcc will decrease is not zero. Further, when the reference for comparing the full-wave rectified voltage VH is higher than the load of the node NVcc, the loss increases.

Therefore, a fifth embodiment in which a reference for comparing the full-wave rectified voltage VH with respect to the load of the node NVcc, that is, a threshold value is adaptively switched will be described.

Figure 20:
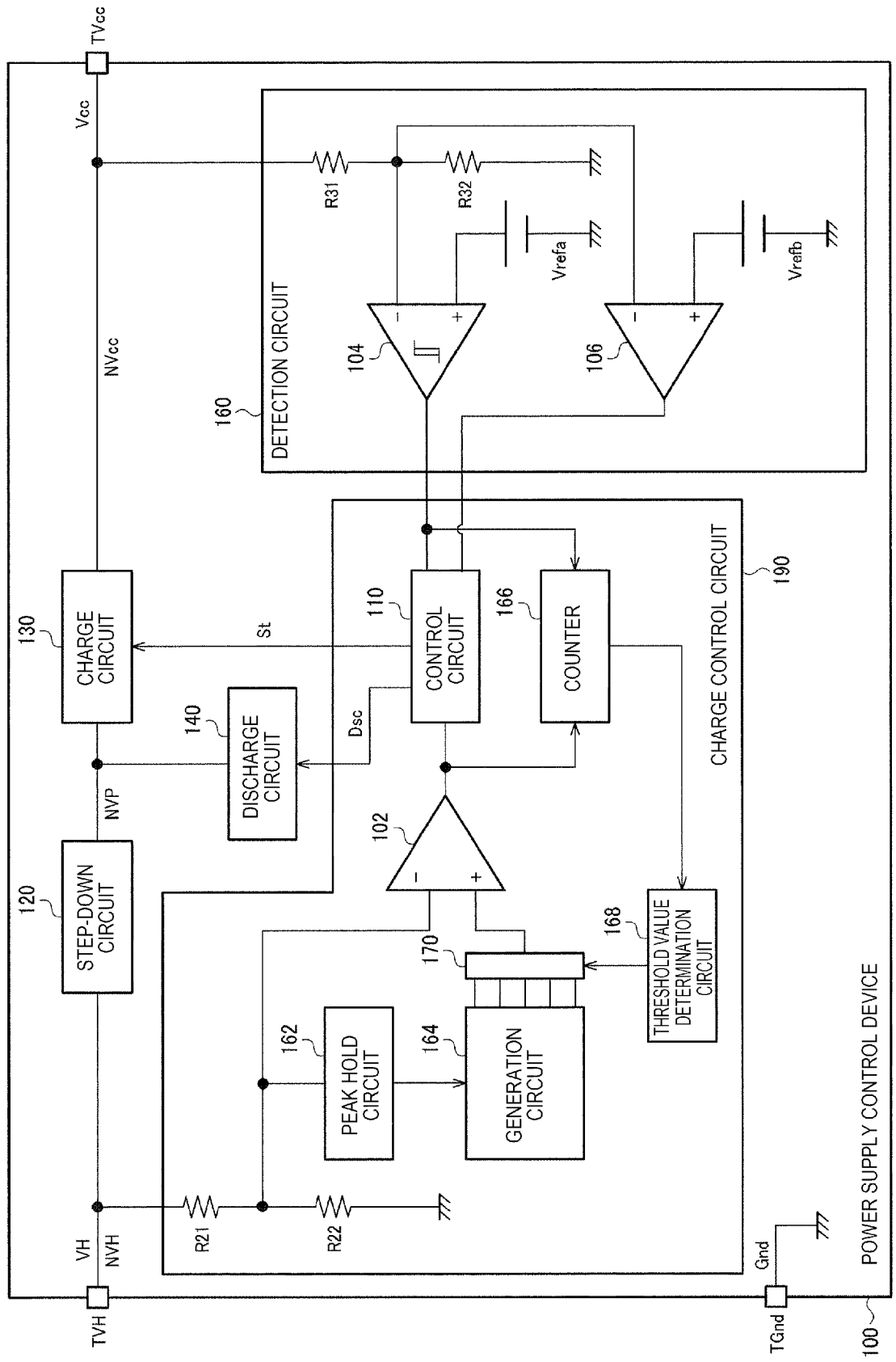
FIG. 20 is a diagram showing a power supply control device according to a fifth embodiment.

FIG. 20 is a diagram showing an example of the power supply control device 100 according to the fifth embodiment. In the fifth embodiment shown in FIG. 20, the peak hold circuit 162, the generation circuit 164, the counter 166, the threshold value determination circuit 168, and the selection circuit 170 are provided for the third embodiment shown in FIG. 10.

The peak hold circuit 162 samples and holds the peak value of the voltage obtained by dividing the full-wave rectified voltage VH supplied to the node NVH by the resistors R21 and R22, that is, the maximum voltage.

The generation circuit 164 divides the peak value held by the peak hold circuit 162, for example, to generate a plurality of voltages. Here, the plurality of voltages are voltages that differ in stages, for example, voltages corresponding to 90%, 70%, 50%, 30%, and 10% of the peak voltage. The generation circuit 164 is not limited to voltage division, and may be configured to generate the plurality of voltages by coefficient calculation such as an operational amplifier.

The selection circuit 170 selects one of the plurality of voltages generated by the generation circuit 164 in accordance with an instruction from the threshold value determination circuit 168.

The counter 166 counts the number of times detected by the comparator 102 as follows in the period detected by the Schmitt trigger circuit 104 as follows. Specifically, the counter 166 counts the number of times detected by the comparator 102, that is, the number of times that the full-wave rectified voltage VH is less than the voltage at the positive input terminal (+) of the comparator 102 in the period detected by the Schmitt trigger circuit 104, that is, in the period from when the power supply voltage Vcc decreases and becomes less than the threshold voltage Vdet_L until the power supply voltage Vcc increases and becomes equal to or higher than the threshold voltage Vdet_U.

The control circuit 110 turns on the charge circuit 130 when the full-wave rectified voltage VH is less than the voltage at the positive input terminal (+) of the Schmitt trigger circuit 104 during the above period. Therefore, the counter 166 counts the number of times the capacitor C12 has been charged in the period in which the power supply voltage Vcc recovers from the threshold voltage Vdet_L to the threshold voltage Vdet_U. Since the number of times of charging varies depending on the load of the node NVcc, the number of times counted by the counter 166 eventually indicates the load of the node NVcc.

For example, the counter 166 resets the number of counts when the Schmitt trigger circuit 104 detects that the power supply voltage Vcc has increased to reach the threshold voltage Vdet_U.

The threshold value determination circuit 168 determines which one of the plurality of voltages generated by the generation circuit 164 is to be selected according to the number of counts by the counter 166 and instructs the selection circuit 170.

Specifically, if the number of counts by the counter 166 is equal to or less than m, the threshold value determination circuit 168 instructs switching to a voltage one step lower than the voltage currently selected in the selection circuit 170. On the other hand, if the number of counts by the counter 166 is greater than or equal to n, the threshold value determination circuit 168 instructs switching to a voltage one step higher than the voltage currently selected by the selection circuit 170.

m and n are integers satisfying m<n. m is also called a first count value, and n is also called a second count value.

The number of counts by the counter 166 being m or less means that a relatively small number of times of charging is required for the power supply voltage Vcc to recover from the threshold voltage Vdet_L to the threshold voltage Vdet_U. Here, the state in which a relatively small number of times of charging is required means that, conversely, the charging time per one time is long, and this means that the voltage at the positive input terminal (+) of the comparator 102 is high and the loss is large. Therefore, the threshold value determination circuit 168 instructs the selection circuit 170 to switch to a voltage one step lower in order to suppress loss if the number of counts is less than or equal to m.

On the other hand, the number of counts by the counter 166 being n or more means that a relatively large number of times of charging is required until the power supply voltage Vcc is recovered from the threshold voltage Vdet_L to the threshold voltage Vdet_U. Here, the state that a large number of times of charging is required means that, conversely, because the voltage at the positive input terminal (+) of the comparator 102 is low, the charging time is shortened per one time, and it takes time for the power supply voltage Vcc to recover to the threshold voltage Vdet_U. For this reason, the threshold value determination circuit 168 instructs the selection circuit 170 to switch to a voltage one step higher so that the power supply voltage Vcc can be recovered in a shorter time if the number of counts is n or more.

The threshold value determination circuit 168 and the selection circuit 170 are an example of a switching circuit that switches to a first voltage, a voltage lower than the first voltage, or a voltage higher than the first voltage.

When the number of counts by the counter 166 is larger than m and smaller than n, the threshold value determination circuit 168 does not instruct the selection circuit 170 to switch the voltage.

Therefore, according to the fifth embodiment, since the reference for comparing the full-wave rectified voltage VH with respect to the number of times of charging, that is, the load on the node NVcc, that is, the reference for turning on the charge circuit 130 is appropriately set after a plurality of times of switching, the power consumption can be reduced while avoiding the inoperability of the power supply control device 100.

According to the fifth embodiment, since the reference for turning on the charge circuit 130 is adaptively set without depending on the voltage of the AC power supply 10, there is also an effect that the switching power supply 1 can be used regardless of the country or region.

In the third embodiment, the fourth embodiment, and the fifth embodiment described above, the on-state of the discharge circuit 140 is a discharge of electric charges accumulated in the capacitance component, and thus is a kind of loss. For this reason, the configuration in which the discharge circuit 140 is turned on over the entire period in which the power supply voltage Vcc falls below the threshold voltage Vdet_L and is less than the threshold voltage Vdet_U can be said to have room for improvement from the viewpoint of reducing power consumption.

A sixth embodiment in which this point is improved will be described.

Figure 21:
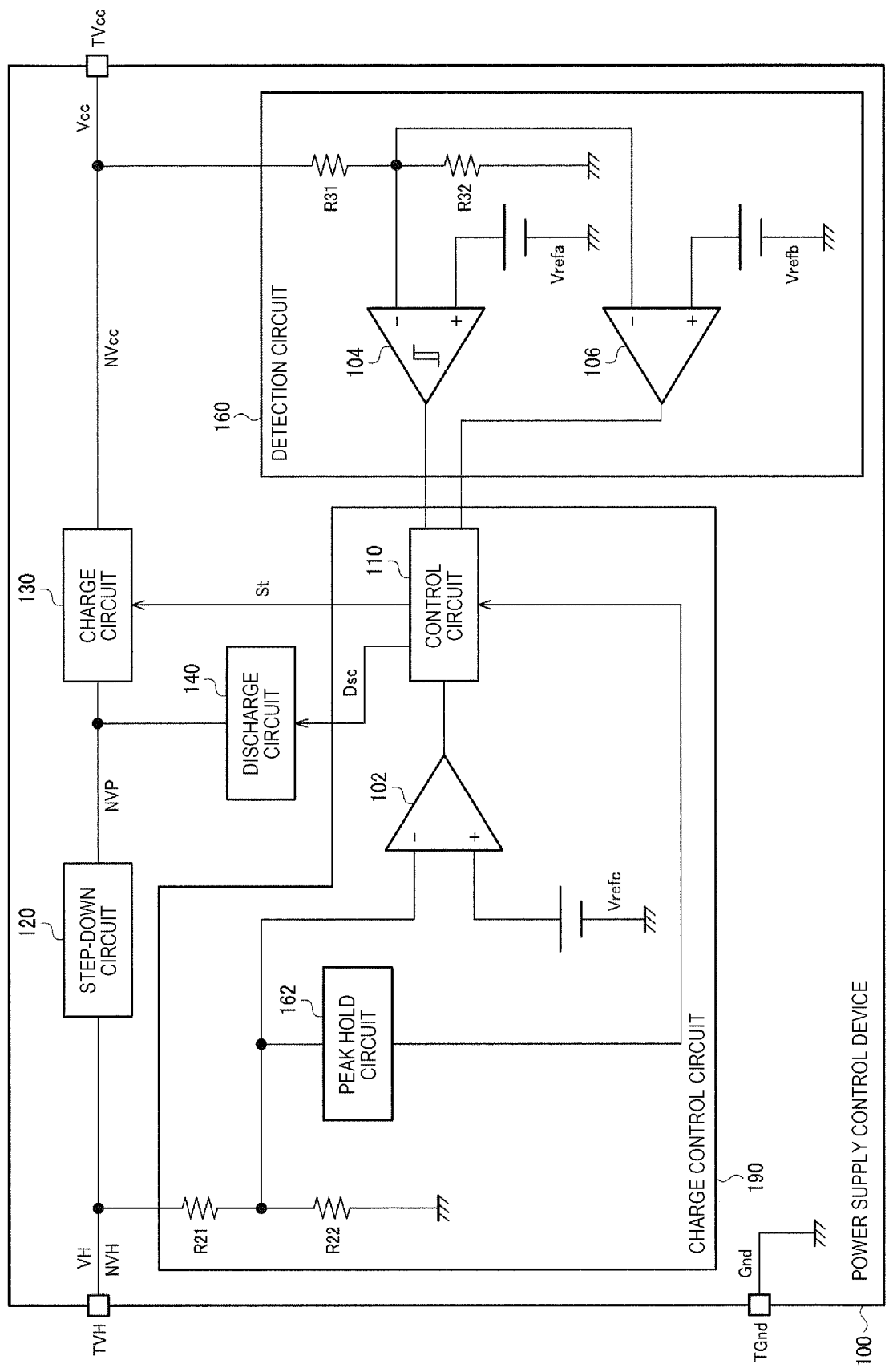
FIG. 21 is a diagram showing a power supply control device according to a sixth embodiment.

FIG. 21 is a diagram showing an example of the power supply control device 100 according to the sixth embodiment.

The sixth embodiment shown in FIG. 21 is a configuration when applied to the third embodiment shown in FIG. 10, and in contrast to the third embodiment, a peak detection circuit 150 is provided, and a function for controlling the discharge circuit 140 based on the detection result of the peak detection circuit 150 is added to the control circuit 110.

The peak detection circuit 150 detects the peak of the voltage waveform obtained by dividing the full-wave rectified voltage VH, and notifies the control circuit 110 of the detected peak timing.

The control circuit 110 intermittently turns on the discharge circuit 140 after the timing of the peak detected by the peak detection circuit 150 when the power supply voltage Vcc falls below the threshold voltage Vdet_L and is in a range less than the threshold voltage Vdet_U.

The control circuit 110 is similar to the third embodiment in that the charge circuit 130 is turned on when the full-wave rectified voltage VH is less than the threshold voltage Vth_ac. Here, when the charge circuit 130 is turned on, the load on the node NVH increases, so that the voltage waveform of the full-wave rectified voltage VH input to the node NVH has a good follow-up property at the fall of the full-wave rectification, and it can be said that the necessity of turning on the discharge circuit 140 is poor. Therefore, in the present embodiment, the control circuit 110 executes the intermittent turn-on of the discharge circuit 140 during a period from when the voltage peak at the full-wave rectified voltage VH is detected until the full-wave rectified voltage VH becomes less than the threshold voltage Vth_ac and the charge circuit 130 is turned on.

However, when the power supply voltage Vcc decreases and reaches the threshold voltage Vdet_L, it is necessary to detect the full-wave rectified voltage VH in a state in which the follow-up property at the fall of the full-wave rectification is good. Therefore, when the power supply voltage Vcc reaches the threshold voltage Vdet_L, the control circuit 110 turns on the discharge circuit 140 regardless of the full-wave rectified voltage VH exceptionally, and when the full-wave rectified voltage VH is less than the threshold voltage Vth_ac and the charge circuit 130 is turned on, the control circuit 110 does not intermittently turn on the discharge circuit 140.

Figure 22:
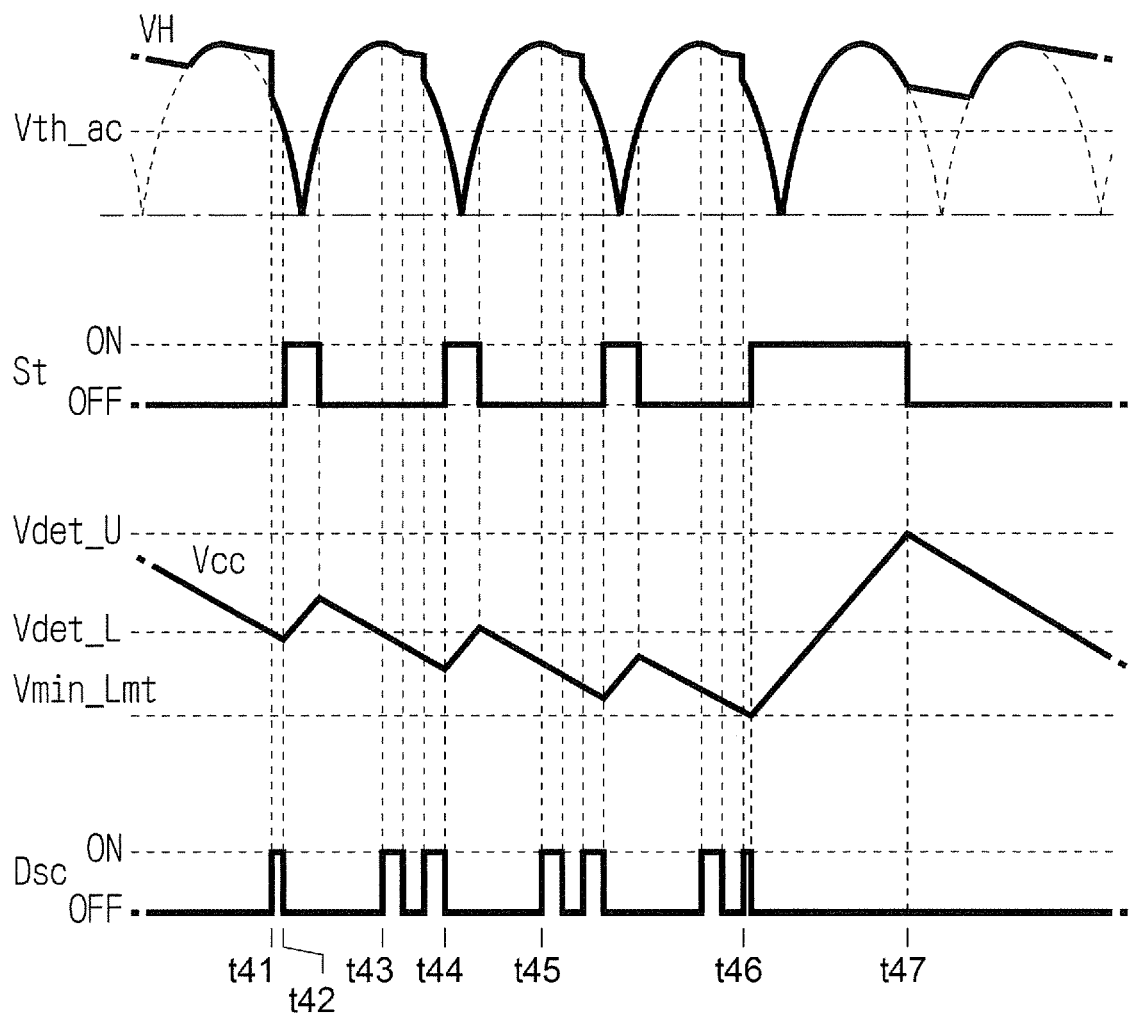
FIG. 22 is a diagram showing a charging operation and a discharging operation with respect to the full-wave rectified voltage and the power supply voltage.

FIG. 22 is a diagram showing an operation of the power supply control device 100 according to the sixth embodiment.

As shown in FIG. 22, when the power supply voltage Vcc decreases and reaches the threshold voltage Vdet_L at time t41, the discharge circuit 140 is turned on exceptionally rather than intermittently. When the discharge circuit 140 is turned on, the follow-up property at the fall of the full-wave rectification is good in the waveform of the full-wave rectified voltage VH. In this state, when the full-wave rectified voltage VH becomes less than the threshold voltage Vth_ac at time t42, the charge circuit 130 is turned on and the discharge circuit 140 is turned off.

After the full-wave rectified voltage VH reaches a peak at time t43, the discharge circuit 140 is intermittently turned on. When the full-wave rectified voltage VH becomes less than the threshold voltage Vth_ac at time t44, the charge circuit 130 is turned on, while the discharge circuit 140 interrupts intermittent turn-on and shifts to off.

When the full-wave rectified voltage VH reaches the peak again at time t45, the intermittent turn-on of the discharge circuit 140 is resumed. When the full-wave rectified voltage VH becomes less than the threshold voltage Vth_ac, the charge circuit 130 is turned on, while the discharge circuit 140 interrupts intermittent turn-on and shifts to off. Such an operation is repeated until the power supply voltage Vcc reaches the threshold voltage Vmin_Lmt at time t46.

With the power supply control device 100 according to the sixth embodiment, compared to the third embodiment, the power consumption can be further reduced as the amount of loss is reduced by intermittently turning on the discharge circuit 140.

In the sixth embodiment, the control circuit 110 may be configured to continue intermittent turn-on instead of turning off the discharge circuit 140 when turning on the charge circuit 130.

That is, in the sixth embodiment, the control circuit 110 may be configured to intermittently turn on the discharge circuit 140 for a predetermined number of times after the full-wave rectified voltage VH reaches a peak.

Further, the intermittent ON of the discharge circuit 140 in the sixth embodiment is not limited to the third embodiment, and can be applied to the fourth embodiment or the fifth embodiment.

In the third to sixth embodiments, the step-down circuit 120 is not always necessary. When the step-down circuit 120 is not provided, the node NVcc and the node NVP may be regarded as the same.

In addition, when the full-wave rectified voltage VH becomes less than the threshold voltage Vth_ac, the charge circuit 130 is turned on every time, but the configuration may be such that the charge circuit 130 is turned on once for a plurality of times when the full-wave rectified voltage VH is less than the threshold voltage Vth_ac.

When the full-wave rectified voltage VH is less than the threshold voltage Vth_ac and near zero, the transistor 134 does not turn on because the voltage between the source node and the gate node becomes insufficient. For this reason, strictly speaking, when the full-wave rectified voltage VH is near zero, the capacitor C12 is not charged, so the power supply voltage Vcc does not increase and becomes flat. However, in FIGS. 13, 16, 17, 19, and 22, for simplification of explanation, it is expressed as the power supply voltage Vcc increases at a constant rate even if the value is near zero if the full-wave rectified voltage VH is less than the threshold voltage Vth_ac.

The power supply control devices described in the above third to sixth embodiments include a charge circuit, a first detection circuit, a second detection circuit, a third detection circuit, and a control circuit. The charge circuit charges the full-wave rectified voltage input to the first node to the capacitor coupled to the second node when turned on. The first detection circuit detects whether or not the voltage at the first node is less than the first voltage. The second detection circuit detects whether or not the voltage at the second node decreases to be less than the second voltage, and whether or not the voltage at the second node increases to be a third voltage higher than the second voltage. The third detection circuit detects whether or not the voltage at the second node is less than a fourth voltage that is lower than the second voltage. The control circuit turns on the charge circuit when the first detection circuit detects that the voltage at the first node is less than the first voltage during the period from when it is detected by the second detection circuit that the voltage at the second node is decreased to less than the second voltage, until the voltage at the second node is increased to reach the third voltage. When the third detection circuit detects that the voltage of the second node is less than the fourth voltage, the control circuit turns on the charge circuit even if the first detection circuit does not detect that the voltage at the first node is lower than the first voltage.

In addition, the power supply control device of the present embodiment includes a charge circuit, a first detection circuit, a second detection circuit, a third detection circuit, a control circuit, and a switching circuit. The charge circuit charges the full-wave rectified voltage input to the first node to the capacitor coupled to the second node when turned on. The first detection circuit detects whether or not the voltage at the first node is less than the first voltage. The second detection circuit detects whether or not the voltage at the second node decreases to be less than the second voltage, and whether or not the voltage at the second node increases to be a third voltage higher than the second voltage. The third detection circuit detects whether or not the voltage at the second node is less than a fourth voltage that is lower than the second voltage. The control circuit turns on the charge circuit when the first detection circuit detects that the voltage at the first node is less than the first voltage during the period from when it is detected by the second detection circuit that the voltage at the second node is decreased to less than the second voltage, until the voltage at the second node is increased to reach the third voltage. The switching circuit switches the first voltage to a voltage different from the first voltage when the third detection circuit detects that the voltage of the second node is less than the fourth voltage.

In the present embodiment, the power supply control device may include a counting circuit that counts the number of times the charge circuit is turned on from when the voltage at the second node falls below the second voltage to when the voltage reaches the third voltage. If the number of times counted by the counting circuit is less than or equal to m when m and n are integers satisfying m<n, the switching circuit may switch the first voltage to a voltage lower than the first voltage if the number of times counted by the counting circuit is less than or equal to m, and may switch the first voltage to a voltage higher than the first voltage if the number of times counted by the counting circuit is n or more.

In the present embodiment, the power supply control device may include a generation circuit that generates a plurality of voltages lower than the peak voltage of the full-wave rectified voltage input to the first node. The switching circuit may select one of the plurality of voltages generated by the generation circuit and switch from the first voltage.

In the present embodiment, the power supply control device may include a discharge circuit that discharges the electric charge accumulated in the first node when turned on. The control circuit may turn on the discharge circuit for a part or entirety of the period from when the voltage at the second node decreases to less than the second voltage until the voltage at the second node increases to become the third voltage or higher.

5. Electronic Apparatus

Figure 24:
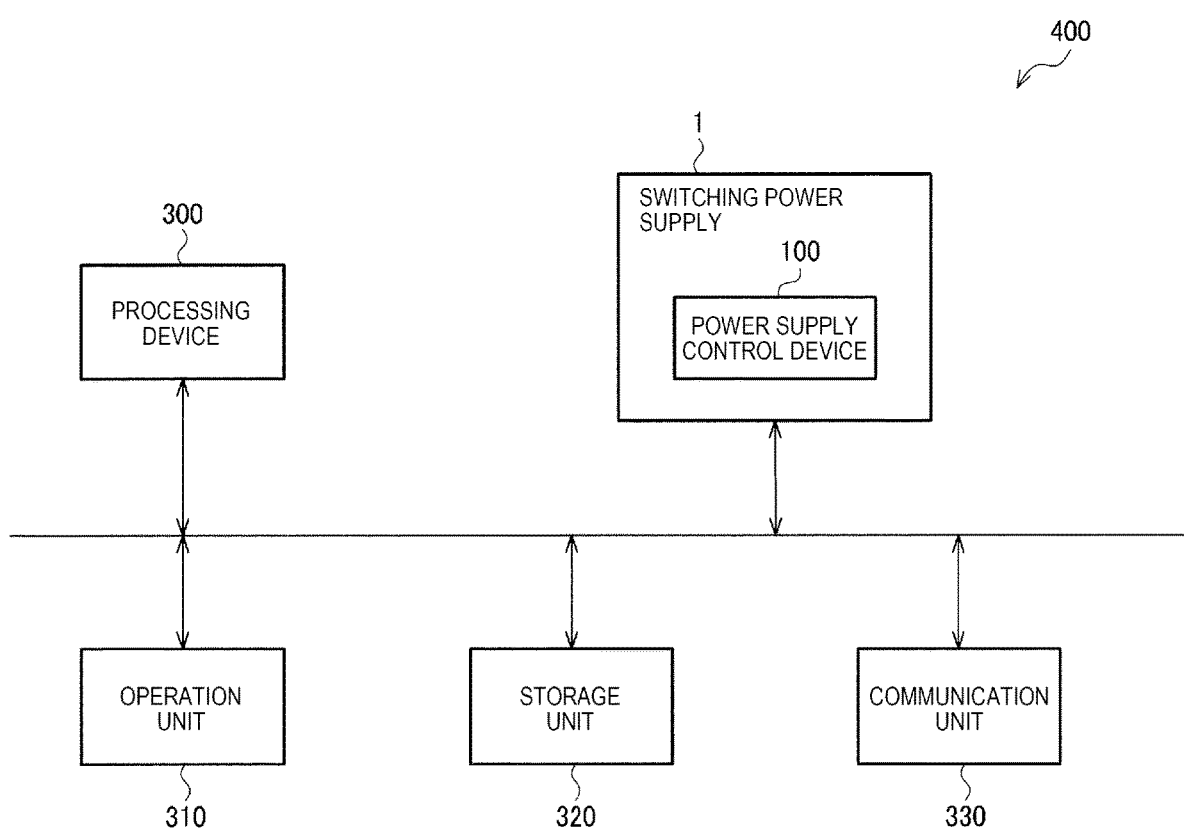
FIG. 24 is a configuration example of an electronic apparatus.

FIG. 24 is a configuration example of an electronic apparatus 400 including the power supply control device 100. The electronic apparatus 400 includes the switching power supply 1, a processing device 300, an operation unit 310, a storage unit 320, and a communication unit 330. The switching power supply 1 includes a power supply control device 100. As an electronic apparatus 400, various electronic devices including an ACDC converter can be assumed. For example, the electronic apparatus 400 is a printing device, a projection device, a robot, a network-related device, a measuring device, a biological information measuring device, a video device, or the like.

The switching power supply 1 performs AC/DC conversion on AC power supply from a household power supply and supplies the DC voltage to each unit of the electronic apparatus 400. The communication unit 330 communicates with an external device. The external device is an information processing device such as a PC. The communication unit 330 may be a communication interface such as a USB standard, or may be a network interface such as a LAN. The storage unit 320 stores data input from the communication unit 330. The storage unit 320 may function as a working memory of the processing device 300. The storage unit 320 is various storage devices such as a semiconductor memory or a hard disk drive. The operation unit 310 is a user interface for the user to operate the electronic apparatus 400. For example, the operation unit 310 is a button or a touch panel, a pointing device, a character input device, or the like. The processing device 300 is a processor such as a CPU or MPU. The processing device 300 processes the data stored in the storage unit 320.

When the electronic apparatus 400 is a printing device, the electronic apparatus 400 may further include, for example, a printing unit and a paper feeding device. In this case, the communication unit 330 may be various video interfaces such as the VGA standard, the DVI standard, or the HDMI (registered trademark) standard. Then, the storage unit 320 stores the image data input from the communication unit 330, and the processing device 300 controls the printing unit and the paper feeding device based on the image data stored in the storage unit 320, and the printing unit and the paper feeding device perform printing based on the control.

The power supply control device according to the present embodiment described above includes a charge circuit, a detection circuit, and a charge control circuit. The charge circuit charges a capacitor coupled to the power supply voltage node based on the full-wave rectified voltage input to the first node. The detection circuit detects whether or not the power supply voltage, which is the voltage at the power supply voltage node, is lower than the first threshold voltage, and whether or not the power supply voltage reached a second threshold voltage higher than the first threshold voltage. The charge control circuit performs charge control on the charge circuit based on the detection result from the detection circuit. The charge control circuit enables the charge mode of the charge circuit when the detection circuit detects that the power supply voltage is lower than the first threshold voltage and disables the charge mode when the detection circuit detects that the power supply voltage reached the second threshold voltage. The charge control circuit sets the charge capacity of the charge circuit in the second charge mode period in which the charge mode is subsequently enabled, according to the length of the first charge mode period in which the charge mode is enabled.

In this way, the charge capacity of the charge circuit in the first charge mode period is monitored by monitoring the length of the first charge mode period. Then, the charge capacity in the second charge mode period is set according to the length of the first charge mode period. Thereby, an appropriate threshold voltage for rectified voltage is set according to various AC voltages.

In the present embodiment, the charge control circuit may detect whether or not the full-wave rectified voltage is lower than the threshold voltage for rectified voltage in the first charge mode period and the second charge mode period. The charge control circuit may cause the charge circuit to perform a charging operation for charging the capacitor during a period in which it is detected that the full-wave rectified voltage is lower than the threshold voltage for rectified voltage in the first charge mode period and the second charge mode period.

The charge current when charging the capacitor in the charge mode causes power loss in the charge path. The power loss is represented by (voltage at both ends of the circuit through which the charge current flows)×(charge current). For this reason, as the charge current flows through the charge path only when the full-wave rectified voltage is low, the voltage at both ends of the circuit through which the charge current flows can be reduced, and the power loss in the charge path can be reduced.

In the present embodiment, the charge control circuit may count the number of charging operations in the first charge mode period, and set the charge capacity in the second charge mode period based on the count value that is the count result.

Since the charging operation is performed in the cycle of the full-wave rectified voltage, the number of charging operations in the first charge mode period represents the length of the first charge mode period. For this reason, the charge control circuit can set the charge capacity in the second charge mode period based on the length of the first charge mode period by setting the charge capacity in the second charge mode period based on the count value.

In the present embodiment, the charge control circuit may decrease the charge capacity when the count value is less than or equal to the first count value, and may increase the charge capacity when the count value is higher than or equal to the second count value higher than the first count value.

When the charge capacity is high, the charge mode period is shortened, so the count value is small. When the count value is less than or equal to the first count value, the charge control circuit can reduce the charge capacity, thereby reducing the charge capacity. On the other hand, when the charge capacity is low, the charge mode period becomes long, and the count value becomes large. When the count value is equal to or greater than the second count value, the charge control circuit can increase the charge capacity, thereby increasing the charge capacity. In this way, an appropriate charge capacity is set.

In the present embodiment, the charge control circuit may maintain the charge capacity when the count value is larger than the first count value and smaller than the second count value.

As described above, the charge control circuit decreases the charge capacity when the count value is equal to or less than the first count value, and increases the charge capacity when the count value is equal to or higher than the second count value. As a result, the charge capacity is controlled so that the count value is in a range larger than the first count value and smaller than the second count value, and the charge capacity is maintained. In this way, an appropriate charge capacity is set.

In the present embodiment, the charge control circuit may set the charge capacity in the second charge mode period by setting the threshold voltage for rectified voltage in the second charge mode period according to the length of the first charge mode period.

As described above, the charge circuit performs the charging operation during the period in which it is detected that the full-wave rectified voltage is lower than the threshold voltage for rectified voltage. For this reason, the length of the period during which the charging operation is performed varies according to the threshold voltage for rectified voltage. Since the charge capacity is higher as the length of the period during which the charging operation is performed, the charge capacity can be set by setting the threshold voltage for rectified voltage by the charge control circuit.

In the present embodiment, the charge control circuit may include a rectified voltage divider circuit, a peak hold circuit, a reference voltage generation circuit, and a comparator. The rectified voltage divider circuit may output a divided rectified voltage obtained by dividing the full-wave rectified voltage. The peak hold circuit may output a hold voltage obtained by holding the peak voltage of the divided rectified voltage. The reference voltage generation circuit may generate a reference voltage for rectified voltage from the hold voltage. The comparator may detect whether or not the full-wave rectified voltage is lower than the threshold voltage for rectified voltage by comparing the reference voltage for rectified voltage and the divided rectified voltage. The charge control circuit may set the charge capacity in the second charge mode period by setting the reference voltage for rectified voltage in the second charge mode period according to the count value in the first charge mode period.

In this way, the comparator can detect whether or not the full-wave rectified voltage is lower than the threshold voltage for rectified voltage by comparing the reference voltage for rectified voltage and the divided rectified voltage. Then, by setting the reference voltage for rectified voltage by the charge control circuit, the threshold voltage for rectified voltage that is compared with the full-wave rectified voltage can be set.

In the present embodiment, the charge control circuit may set the charge capacity in the second charge mode period by setting the charge current output by the charge circuit to the capacitor in the second charge mode period according to the length of the first charge mode period.

The larger the charge current that the charge circuit outputs to the capacitor, the higher the charge capacity. Therefore, the charge control circuit sets the charge current according to the length of the first charge mode period, so that the charge capacity in the second charge mode period can be set according to the length of the first charge mode period.

In the present embodiment, the detection circuit may output a charge mode setting signal that becomes active when the power supply voltage is a voltage between the first threshold voltage and the second threshold voltage. The charge control circuit may set the charge circuit to the charge mode when the charge mode setting signal is active.

In this way, the charge control circuit can set the charge circuit to the charge mode based on a charge mode setting signal that is active when the power supply voltage is a voltage between the first threshold voltage and the second threshold voltage.

In the present embodiment, the detection circuit may include a power supply voltage divider circuit and a Schmitt trigger circuit. The power supply voltage divider circuit may output a divided power supply voltage obtained by dividing the power supply voltage. The Schmitt trigger circuit may compare the divided power supply voltage with the detection reference voltage and output the comparison result as a charge mode setting signal.

The Schmitt trigger circuit has hysteresis. For this reason, the Schmitt trigger circuit compares the divided power supply voltage and the detection reference voltage, so that the power supply voltage and the first threshold voltage can be compared, and the power supply voltage and the second threshold voltage can be compared. Specifically, when the power supply voltage decreases, it is detected whether or not the power supply voltage is lower than the first threshold voltage, and when the power supply voltage increases, it is detected whether or not the power supply voltage reached the second threshold voltage.

In the present embodiment, the power supply control device may include a step-down circuit. The step-down circuit may be provided between the first node and the charge circuit, and may output a voltage obtained by stepping down the full-wave rectified voltage to the charge circuit.

Since the step-down circuit steps down the full-wave rectified voltage, if a charge current flows when the full-wave rectified voltage is high, power loss in the step-down circuit increases. As described above, in this embodiment, since the charge current flows when the full-wave rectified voltage is lower than the threshold voltage for rectified voltage, power loss in the step-down circuit can be reduced.

The switching power supply according to the present embodiment includes any of the power supply control devices described above, a first rectifier circuit, a second rectifier circuit, a transformer, a switching element, a first output circuit, and a second output circuit. The first rectifier circuit rectifies the AC voltage. The second rectifier circuit performs full-wave rectification of the AC voltage and supplies to the first node as a full-wave rectified voltage. The transformer has a primary winding, a secondary winding, and an auxiliary winding. The switching element is provided in series with the primary winding between the output both ends of the first rectifier circuit. The first output circuit rectifies and smooths the voltage induced in the secondary winding and outputs the voltage. The second output circuit rectifies and smooths the voltage induced in the auxiliary winding and outputs the voltage to the second node. The power supply control device controls switching of the switching element.

The electronic apparatus of this embodiment includes the power supply control device described in any of the above.

Although the present embodiments have been described in detail as described above, it will be easily understood by those skilled in the art that many modifications can be made without departing from the novel matters and effects of the present disclosure. Accordingly, all such modification examples are intended to be included within the scope of the present disclosure. For example, a term described at least once together with a different term having a broader meaning or the same meaning in the specification or the drawings can be replaced with the different term in any part of the specification or the drawings. All combinations of the present embodiments and the modification examples are also included in the scope of the present disclosure. Further, the configuration and operation of the power supply control device, the switching power supply, and the electronic apparatus are not limited to those described in the present embodiments, and various modifications can be made.

What is claimed is:

1. A power supply control device comprising:
a charge circuit that charges a capacitor coupled to a power supply voltage node based on a full-wave rectified voltage input to a first node;
a detection circuit that detects whether or not a power supply voltage which is a voltage of the power supply voltage node is lower than a first threshold voltage and whether or not the power supply voltage reached a second threshold voltage higher than the first threshold voltage; and
a charge control circuit that performs charge control with respect to the charge circuit based on a detection result from the detection circuit, wherein
the charge control circuit enables a charge mode of the charge circuit when the detection circuit detects that the power supply voltage is lower than the first threshold voltage, and disables the charge mode when the detection circuit detects that the power supply voltage reached the second threshold voltage, and the charge control circuit sets charge capacity of the charge circuit in a second charge mode period in which the charge mode is subsequently enabled according to a length of a first charge mode period in which the charge mode is enabled.

2. The power supply control device according to claim 1, wherein
the charge control circuit detects whether or not the full-wave rectified voltage is lower than a threshold voltage for rectified voltage in the first charge mode period and the second charge mode period, and
the charge control circuit causes the charge circuit to perform a charging operation of charging the capacitor in a period in which the full-wave rectified voltage is detected to be lower than the threshold voltage for rectified voltage of the first charge mode period and the second charge mode period.

3. The power supply control device according to claim 2, wherein
the charge control circuit counts the number of the charging operations in the first charge mode period, and sets the charge capacity in the second charge mode period based on a count value which is a count result.

4. The power supply control device according to claim 3, wherein
the charge control circuit decreases the charge capacity when the count value is equal to or less than a first count value, and increases the charge capacity when the count value is equal to or higher than a second count value higher than the first count value.

5. The power supply control device according to claim 4, wherein
the charge control circuit maintains the charge capacity when the count value is larger than the first count value and smaller than the second count value.

6. The power supply control device according to claim 2, wherein
the charge control circuit sets the charge capacity in the second charge mode period by setting the threshold voltage for rectified voltage in the second charge mode period according to the length of the first charge mode period.

7. The power supply control device according to claim 3, wherein
the charge control circuit includes
a rectified voltage divider circuit that outputs a divided rectified voltage obtained by dividing the full-wave rectified voltage,
a peak hold circuit that outputs a hold voltage obtained by holding a peak voltage of the divided rectified voltage,
a reference voltage generation circuit that generates a reference voltage for rectified voltage from the hold voltage, and
a comparator that detects whether or not the full-wave rectified voltage is lower than the threshold voltage for rectified voltage by comparing the reference voltage for rectified voltage and the divided rectified voltage, and the charge control circuit sets the charge capacity in the second charge mode period by setting the reference voltage for rectified voltage in the second charge mode period according to the count value in the first charge mode period.

8. The power supply control device according to claim 1, wherein
the charge control circuit sets the charge capacity in the second charge mode period by setting a charge current output by the charge circuit to the capacitor in the second charge mode period according to the length of the first charge mode period.

9. The power supply control device according to claim 1, wherein
the detection circuit outputs a charge mode setting signal that becomes active when the power supply voltage is a voltage between the first threshold voltage and the second threshold voltage, and
the charge control circuit sets the charge circuit to the charge mode when the charge mode setting signal is active.

10. The power supply control device according to claim 9, wherein
the detection circuit includes
a power supply voltage divider circuit that outputs a divided power supply voltage obtained by dividing the power supply voltage, and
a Schmitt trigger circuit that compares the divided power supply voltage and a detection reference voltage and outputs a comparison result as the charge mode setting signal.

11. The power supply control device according to claim 1, further comprising:
a step-down circuit that is provided between the first node and the charge circuit, and outputs a voltage obtained by stepping down the full-wave rectified voltage to the charge circuit.

12. A switching power supply comprising:
the power supply control device according to claim 1;
a first rectifier circuit that rectifies an AC voltage;
a second rectifier circuit that full-wave rectifies the AC voltage and supplies the AC voltage to the first node as the full-wave rectified voltage;
a transformer that includes a primary winding, a secondary winding, and an auxiliary winding;
a switching element that is provided in series with the primary winding between both output ends of the first rectifier circuit;
a first output circuit that rectifies and smooths a voltage induced by the secondary winding and outputs the voltage; and
a second output circuit that rectifies and smooths a voltage induced by the auxiliary winding and outputs the voltage to the power supply voltage node, wherein
the power supply control device controls switching of the switching element.

13. An electronic apparatus comprising the power supply control device according to claim 1.

* * * * *